United States Patent
Fan et al.

(10) Patent No.: US 12,075,429 B2
(45) Date of Patent: Aug. 27, 2024

(54) METHOD FOR DETERMINING CONFIGURED RESOURCE, AND APPARATUS

(71) Applicant: Huawei Technologies Co., Ltd., Shenzhen (CN)

(72) Inventors: Qiang Fan, Hefei (CN); Chong Lou, Shanghai (CN); Qufang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 472 days.

(21) Appl. No.: 17/384,381

(22) Filed: Jul. 23, 2021

(65) Prior Publication Data

US 2021/0352640 A1 Nov. 11, 2021

Related U.S. Application Data

(63) Continuation of application No. PCT/CN2020/073323, filed on Jan. 20, 2020.

(30) Foreign Application Priority Data

Jan. 24, 2019 (CN) .......................... 201910069176.5

(51) Int. Cl.
*H04W 72/23* (2023.01)
*H04L 5/00* (2006.01)
*H04W 72/044* (2023.01)

(52) U.S. Cl.
CPC ........... *H04W 72/23* (2023.01); *H04L 5/0044* (2013.01); *H04L 5/0053* (2013.01); *H04W 72/044* (2013.01)

(58) Field of Classification Search
CPC ........... H04W 72/0446; H04W 52/146; H04W 82/04; H04W 72/23; H04W 72/044; H04L 5/0044; H04L 5/0053; H04L 5/0082
See application file for complete search history.

(56) References Cited

U.S. PATENT DOCUMENTS

| | | |
|---|---|---|
| 2018/0092122 A1 | 3/2018 | Babaei et al. |
| 2018/0310298 A1 | 10/2018 | Li et al. |

(Continued)

FOREIGN PATENT DOCUMENTS

| | | |
|---|---|---|
| CN | 101686115 A | 3/2010 |
| CN | 102045850 A | 5/2011 |

(Continued)

OTHER PUBLICATIONS

"3rd Generation Partnership Project; Technical Specification Group Services and System Aspects; Study on Communication for Automation in Vertical Domains (Release 16)," 3GPP TR 22.804 V16.2.0, pp. 1-196, 3rd Generation Partnership Project, Valbonne, France (Dec. 2018).

(Continued)

*Primary Examiner* — Raj Jain
(74) *Attorney, Agent, or Firm* — Leydig, Voit & Mayer, Ltd.

(57) ABSTRACT

A method for determining a configured resource includes: obtaining, by a terminal device, configuration information of a configured resource from a network device, where the configured resource is a periodic resource, and the configuration information includes a periodicity parameter of the periodic resource; maintaining, by the terminal device, a sequence number for the configured resource, where the sequence number is updated when a system frame number (SFN) wraps around; and determining, by the terminal (Continued)

device, the configured resource based on the sequence number and the periodicity parameter.

12 Claims, 5 Drawing Sheets

(56) References Cited

U.S. PATENT DOCUMENTS

| | | | | |
|---|---|---|---|---|
| 2018/0332507 | A1 | 11/2018 | Fujishiro et al. | |
| 2019/0182811 | A1 | 6/2019 | Xu | |
| 2020/0389879 | A1* | 12/2020 | Zhang | H04L 5/0053 |
| 2021/0212061 | A1* | 7/2021 | Yang | H04W 72/0446 |
| 2021/0352640 | A1* | 11/2021 | Fan | H04L 5/0094 |
| 2022/0182199 | A1* | 6/2022 | Guo | H04W 52/325 |
| 2022/0248473 | A1* | 8/2022 | Chen | H04W 74/0833 |

FOREIGN PATENT DOCUMENTS

| | | |
|---|---|---|
| CN | 102132516 A | 7/2011 |
| CN | 102394728 A | 3/2012 |
| CN | 102655668 A | 9/2012 |
| CN | 106612555 A | 5/2017 |
| CN | 108024215 A | 5/2018 |
| CN | 109152075 A | 1/2019 |
| CN | 109218000 A | 1/2019 |
| RU | 2658340 C1 | 6/2018 |
| WO | 2015020588 A2 | 2/2015 |
| WO | 2018036437 A1 | 3/2018 |

OTHER PUBLICATIONS

"3rd Generation Partnership Project; Technical Specification Group Radio Access Network; NR; Medium Access Control (MAC) protocol specification (Release 15)," 3GPP TS 38.321 V15.4.0, pp. 1-77, 3rd Generation Partnership Project, Valbonne, France (Dec. 2018).

"3rd Generation Partnership Project; Technical Specification Group Radio Access Network; NR; Radio Resource Control (RRC) protocol specification (Release 15)," 3GPP TS 38.331 V15.4.0, pp. 1-474, 3rd Generation Partnership Project, Valbonne, France (Dec. 2018).

* cited by examiner

METHOD FOR DETERMINING CONFIGURED RESOURCE, AND APPARATUS

CROSS-REFERENCE TO RELATED APPLICATIONS

This application is a continuation of International Application No. PCT/CN2020/073323, filed on Jan. 20, 2020, which claims priority to Chinese Patent Application No. 201910069176.5, filed on Jan. 24, 2019. The disclosures of the aforementioned applications are hereby incorporated by reference in their entireties.

FIELD

This application relates to the field of mobile communications technologies, and in particular to a method for determining a configured resource, and an apparatus.

BACKGROUND

In long term evolution (LTE), there are two scheduling mechanisms: one is dynamic scheduling, to be specific, each time a base station schedules a transmission resource, the base station indicates information such as a time-frequency position of the scheduled resource by using downlink control information (DCI); the other is semi-persistent scheduling (SPS), where the SPS mechanism is suitable for supporting transmission of periodic services such as a voice service, and the SPS mechanism in LTE includes downlink SPS and uplink SPS. The base station configures an SPS function for a terminal device by using RRC dedicated signaling, and configured parameters include an SPS cell radio network temporary identifier (C-RNTI), an SPS resource periodicity, a quantity of processes using an SPS resource, and the like. The base station activates/deactivates the SPS configuration by using the DCI. When the base station activates the SPS configuration by using the DCI, a resource, referred to as an SPS resource, is also specified for the terminal device in the DCI. The resource periodically occurs based on a configured SPS resource periodicity parameter, and a resource position of the resource does not need to be indicated by using the DCI.

Currently, in 5th generation (5G) new radio (NR), the downlink SPS mechanism of LTE is reused in a downlink direction, and a concept of configured grant (CG) is defined in an uplink direction. At present, there are two types of configured grants, namely, a configured grant type 1 and a configured grant type 2. A time-frequency resource position of the configured grant type 1 is provided by a network device to the terminal device by using radio resource control (RRC) signaling, and is stored as a configured uplink grant in the terminal device. The configured grant type 1 (CG type 1) can be used by the terminal device after being configured by using the RRC signaling. The configured grant type 2 (CG type 2) is similar to the uplink SPS in LTE and is activated or deactivated by using physical layer or layer 1 signaling (namely, DCI). When the network device activates the CG type 2 by using the DCI, a time-frequency resource is provided by the network device to the terminal device by using the DCI, and the terminal device stores or clears the configured uplink grant.

Currently, only configuration of a specific periodicity can be supported in the SPS/CG mechanism in NR, that is, the periodicity is divisible by 10240 ms, to ensure that a resource position required by the terminal device matches a resource position obtained through calculation by the terminal device in radio frames of a same system frame number (SFN).

However, with the development of the communications technologies, a configured resource periodicity may be indivisible by 10240 ms. In this case, after a system frame number (SFN) wraps around in a new SFN periodicity, there is a deviation between the resource position required by the terminal device and an SPS/CG resource position obtained through calculation by the terminal device. As a result, transmission requirements of some high-reliability low-latency services cannot be satisfied.

SUMMARY

This application provides a method for determining a configured resource and an apparatus, to effectively determine a configured resource.

According to a first aspect, this application provides a method for determining a configured resource, including: obtaining, by a terminal device, configuration information of a configured resource from a network device, where the configured resource is a periodic resource, and the configuration information includes a periodicity parameter of the periodic resource: maintaining, by the terminal device, a sequence number for the configured resource, where the sequence number is updated when a system frame number (SFN) wraps around: and determining, by the terminal device, the configured resource based on the sequence number and the periodicity parameter. Based on this solution, the terminal device can determine the configured resource based on the periodicity parameter of the periodic resource in the configuration information and the maintained sequence number, to reduce a possibility of a deviation between a configured resource position obtained through calculation and that of a resource actually required by the terminal device, thereby implementing effective configuration of the configured resource.

In a possible implementation method, the configuration information includes configuration information of a value range of the sequence number.

In a possible implementation method, the terminal device obtains the configuration information of the value range of the sequence number from the network device, where the configuration information is L, and L is a positive integer: and the terminal device determines, based on the configuration information of the value range, that the value range of the sequence number is 0 to K−1 or 1 to K, where $K=2^L$.

In a possible implementation method, the terminal device obtains the configuration information of the value range of the sequence number from the network device, where the configuration information is K, and K is a positive integer: and the terminal device determines, based on the configuration information of the value range, that the value range of the sequence number is 0 to K−1 or 1 to K.

In a possible implementation method, a value range of the sequence number is preset to 0 to K−1 or 1 to K, and satisfies: K*10240 ms=Positive integer multiple of a periodicity of the periodic resource.

In a possible implementation method, a value range of the sequence number is determined by a preset value L, and the value range of the sequence number is 0 to K−1 or 1 to K, where $K=2^L$.

In a possible implementation method, the terminal device maintains the sequence number by using a counter, and the sequence number is a value of the counter.

In a possible implementation method, the terminal device maintains the sequence number for the configured resource, and when the SFN wraps around, the sequence number is updated in the following manner: Updated sequence number=(Original sequence number+1) modulo K, where modulo is a modulo operation and K is a total quantity of the sequence numbers.

In a possible implementation method, the sequence number is a hyper-system frame number (H-SFN).

In a possible implementation method, the terminal device obtains configuration information of the H-SFN from the network device by using broadcast signaling.

In a possible implementation method, the configuration information of the H-SFN is a length M of the H-SFN, and the H-SFN identifies $2^{10+M}$ radio frames.

In a possible implementation method, the maintaining, by the terminal device, a sequence number for the configured resource, where the sequence number is updated when an SFN wraps around includes: performing, by the terminal device, an operation of incrementing the H-SFN by 1 for every 1024 radio frames.

In a possible implementation method, a time domain interval determined for the configured resource before and after the SFN wraps around is equal to a positive integer multiple of duration of the SFN.

In a possible implementation method, a time domain interval determined for the configured resource before and after the SFN wraps around is equal to the periodicity of the periodic resource.

According to a second aspect, this application provides a method for determining a configured resource, including: obtaining, by a terminal device, configuration information of a configured resource, where the configuration information includes a first parameter, and the configured resource is a periodic resource: and determining, by the terminal device, a determining manner for the configured resource based on the first parameter. Based on this solution, the terminal device can determine the determining manner for the configured resource based on the first parameter in the configuration information, to determine the configured resource in a relatively appropriate manner, thereby helping implement effective configuration of resources.

In a possible implementation method, the first parameter is a periodicity parameter, and a determining manner to be used for the configured resource by the terminal device when a resource periodicity indicated by the periodicity parameter is indivisible by 10240 ms is different from the determining manner to be used when a resource periodicity is divisible by 10240 ms. Based on this solution, this helps reduce a problem that when a system frame number wraps around, the configured resource is inconsistent with a resource required by the terminal device, to help implement correct configuration of resources and further improve resource configuration efficiency.

In a possible implementation method, the first parameter is time information or indication information. The time information includes SFN information, H-SFN information, or coordinated universal time (UTC)/global positioning system (GPS) time information, and the indication information is used to indicate a determining manner to be used for the configured resource by the terminal device. A determining manner to be used for the configured resource by the terminal device when the terminal device receives the first parameter is different from the determining manner to be used when the terminal device does not receive the first parameter.

In a possible implementation method, the terminal device determines the configured resource based on the resource periodicity of the configured resource and a value of K. The resource periodicity of the configured resource is an integer multiple of symbol symbol/slot slot/millisecond ms. The value of K is a minimum positive integer satisfying: K*10240 ms=Resource periodicity*M, where M is a positive integer, or $K=2^L$ and L is a configured positive integer, or $K=2^M$ and M is a length of a configured hyper-system frame number H-SFN, or K is a configured positive integer.

In a possible implementation method, the terminal device maintains a counter for the configured resource, where a value range of the counter is 0 to K−1, or 1 to K.

In a possible implementation method, when the configured resource is activated, the counter is set to 0, and when the system frame number SFN wraps around, the counter is incremented by 1 and modulo K processing is performed.

In a possible implementation method, the configured resource is a time-frequency resource of a configured grant type 1, and the configuration information further includes a frame number for generating the configuration information or transmitting the configuration information by a network device. The frame number is a system frame number (SFN) or a hyper-system frame number (H-SFN). If a frame number for receiving the configuration information by the terminal device is greater than or equal to the frame number in the configuration information, the terminal device sets the counter to 0; otherwise, the counter is set to 1. This helps set a correct initial value for the counter.

In a possible implementation method, the configured resource is a time-frequency resource of a configured grant type 1, and the terminal device transmits assistance information to the network device by using RRC signaling, where the assistance information is used to indicate a traffic pattern of the terminal device.

In a possible implementation method, the value of K is carried in the configuration information.

In a possible implementation method, the value of K is configured at a media access control (MAC) granularity or a cell granularity (per MAC/per Cell).

In a possible implementation method, the configuration information further includes a bitmap, and the bitmap includes Q bits. Each of the Q bits corresponds to one time zone, and each bit is used to indicate whether a resource is configured in the corresponding time zone. The time zone is X slot/symbol/ms, where X is a positive integer. The terminal device determines the configured resource based on the bitmap.

In a possible implementation method, the resource periodicity of the configured resource is a non-integer multiple of slot/ms. The terminal device determines a validity position of the configured resource based on the resource periodicity: and determines the configured resource based on the validity position.

According to a third aspect, this application provides a communications apparatus. The apparatus may be a terminal device or a chip used for a terminal device. The apparatus has functions of implementing the embodiment in either the first aspect or the second aspect. The functions may be implemented by hardware or by hardware executing corresponding software. The hardware or software includes one or more modules corresponding to the functions. According to a fourth aspect, this application provides a communications apparatus, including a processor and a memory: The memory is configured to store a computer-executable instruction, and when the apparatus is running, the processor executes the computer-executable instruction stored in the memory, to enable the apparatus to perform the method for determining a configured resource as described in any one of the first aspect or the possible implementations of the first aspect, or to enable the apparatus to perform the method for determining a configured resource as described in any one of the second aspect or the possible implementations of the second aspect.

According to a fifth aspect, this application provides a communications apparatus, including a unit or means configured to perform the steps in the first aspect or the second aspect.

According to a sixth aspect, this application provides a communications apparatus, including a processor and an interface circuit, where the processor is configured to communicate with another apparatus through the interface circuit to perform any method provided in the first aspect or the second aspect. There are one or more processors.

According to a seventh aspect, this application provides a communications apparatus, including a processor, configured to: connect to a memory and invoke a program stored in the memory to perform the method in any one of the possible implementations of the first aspect or the possible implementations of the second aspect. The memory may be located inside the apparatus, or may be located outside the apparatus. There are one or more processors.

According to an eighth aspect, this application further provides a computer-readable storage medium, where the computer-readable storage medium stores an instruction, and when the instruction is run on a computer, a processor is enabled to perform the methods in the foregoing aspects.

According to a ninth aspect, this application further provides a computer program product including an instruction. When the computer program product runs on a computer, the computer is enabled to perform the methods in the foregoing aspects.

According to a tenth aspect, this application further provides a chip system, including a processor, configured to perform the methods in the foregoing aspects.

According to an eleventh aspect, this application further provides a communications system, including a terminal device and a network device, where the terminal device includes any communications apparatus in the foregoing aspects.

These aspects or other aspects of this application are described more concisely in the following embodiments.

DESCRIPTION OF EMBODIMENTS

The following further describes this application in detail with reference to the accompanying drawings. Specific operation methods in the method embodiments may also be used in the apparatus embodiments or the system embodiments.

Figure 1:
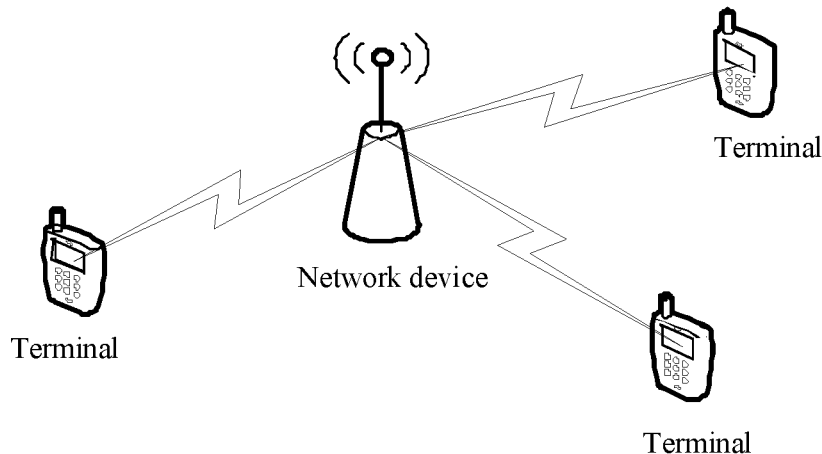
FIG. 1 is a schematic diagram of a possible network architecture according to this application.

FIG. 1 is a schematic diagram of a possible network architecture applicable to this application. The network architecture includes a network device and at least one terminal device. The network device and the terminal device may operate on a 5G NR communications system, where the terminal device may communicate with the network device through the 5G NR communications system. The network device and the terminal device may alternatively operate on other communications systems, which is not limited in the embodiments of this application.

The terminal device, also referred to as user equipment (UE), a mobile station (MS), a mobile terminal (MT), or the like, is a device that provides voice/data connectivity to a user, for example, a handheld device having a wireless connection function or an in-vehicle device. Currently, some examples of terminals are a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, and the like.

The network device is a device in a wireless network, such as a radio access network (RAN) node through which the terminal device accesses the wireless network. Currently, some examples of RAN nodes are a gNB, a transmission receiving point (TRP), an evolved Node B (eNB), a radio network controller (RNC), a Node B (NB), a base station controller (BSC), a base transceiver station (BTS), a home base station (for example, home evolved NodeB, or home Node B, HNB), a baseband unit (BBU), or a wireless fidelity (Wi-Fi) access point (AP), and the like. In a network structure, that network device may include a centralized unit (CU) node, or a distributed unit (DU) node, or a RAN device including a CU node and a DU node.

The following first describes a current method for configuring a periodic resource in NR.

I. Downlink Direction

In NR, during RRC-based configuration of downlink SPS, the base station configures the following parameters, which are not limited to:

periodicity: namely, a periodicity in which an SPS resource occurs repeatedly after SPS is activated by using DCI. In NR R15, a value of an SPS periodicity may include 10 ms, 20 ms, 32 ms, 40 ms, 64 ms, 80 ms, 128 ms, 160 ms, 320 ms, 640 ms. All SPS periodicities are divisible by 10240 ms.

quantity (nrofHARQ-Processes) of hybrid automatic repeat request (HARQ) processes: a quantity of HARQ processes available during processing of downlink SPS resources.

physical uplink control channel (PUCCH) resource: a resource configuration for feeding back a HARQ result by the terminal device.

II. Uplink Direction

When the base station configures a configured grant (CG), RRC-based configuration signaling includes but is not limited to the following parameters:

periodicity: When the base station configures the CG, a value of the periodicity is related to a subcarrier spacing (SCS) of a resource in which the CG is located. Using 15 kHz as an example, the value of the periodicity may include (in units of symbols, where for the 15 KHz SCS, 1 ms includes 14 symbols): 2, 7, and n*14, where n={1, 2, 4, 5, 8, 10, 16, 20, 32, 40, 64, 80, 128, 160, 320, 640}. Currently, all the periodicities supported by the CG are divisible by 10240 ms.

quantity of HARQ processes (nrofHARQ-Processes)/mcs-table, or the like.

For the CG type 1, the base station also provides related configuration of a configured uplink grant resource, including a time domain position and a frequency domain position of a "first" configured uplink grant resource and an offset timeDomainOffset relative to a time point of an SFN of 0, where the offset is in units of slots. Because the configured uplink grant may occupy some symbols in one slot, the time domain position of the "first" configured uplink grant resource herein indicates a length of L symbols occupied from the $S^{th}$ symbol in one slot.

In NR R15, one SPS resource occupies one slot.

The following describes a method for determining a position of a periodic resource and a method for determining a to-be-used HARQ process that are currently configured in NR.

In this application, the configured resource is a non-dynamic scheduling resource or a semi-persistent scheduling resource, and is usually a periodic resource. For example, in the downlink direction, SPS resources are included, and in the uplink direction, CG type 1 resources and CG type 2 resources are included.

It should be noted that, in this application, a semi-persistent scheduling resource in the downlink direction is referred to as a downlink SPS resource, an SPS resource, or SPS: and a semi-persistent scheduling resource in the uplink direction is referred to as a CG type 1, a CG type 2, a CG1 type 1 resource, or a CG type 2 resource. In this application, the SPS or the CG type 2 is merely used to indicate a name of an RRC-based configuration+DCI-based activation (resource indication)/deactivation manner, and the CG type 1 is used to indicate a name of an RRC-based configuration+RRC-based resource indication manner. For the downlink, the RRC-based configuration+RRC-based resource indication manner may also be used, and a corresponding method for calculating a position of a downlink periodic resource and a calculation method for determining an identifier (ID) of a HARQ process for processing the corresponding downlink periodic resource may also be the same as a method corresponding to the CG type 1 in the following embodiments, which are not limited. With the development of the communication standards, these terms may be replaced by other names, which may fall within the protection scope of this application provided that technical essence thereof does not change.

It should be noted that modulo in this application represents a modulo operation, and duration of one system frame being 10 ms is used as an example in this application. The description is provided herein and will not be repeated later.

I. Downlink Direction

1. Method for Determining a Position of a Configured Periodic Resource

When the base station activates the SPS by using the DCI, a position of an SPS resource is specified, and a system frame number (SFN) and slot corresponding to a time domain position of the indicated resource are denoted as $SFN_{start\ time}$ and $slot_{start\ time}$, respectively. The terminal device determines a time domain position of an $N^{th}$ SPS resource by using the following formula (1), that is, the $N^{th}$ SPS resource occurs in a specific slot of a specific SFN, or it can be understood as: If (SFN, slot number in the frame) satisfies the following formula (1), the terminal device determines that the (SFN, slot number in the frame) is a time domain position of a downlink SPS resource (the SPS resource occupies an integer quantity of slots):

$$(numberOfSlotsPerFrame*SFN+slot\ number\ in\ the\ frame) = [(numberOfSlotsPerFrame*SFN_{start\ time}+slot_{start\ time})+N*periodicity*numberOfSlotsPerFrame/10]\ modulo(1024*numberOfSlotsPerFrame) \quad \text{formula (1)},$$

where a value range of SFN is 0, 1, 2, . . . , 1023: a value range of slot number in the frame is 0, 1, 2, . . . , numberOfSlotsPerFrame−1: numberOfSlotsPerFrame represents a quantity of slots included in one system frame: $SFN_{start\ time}$ is a system frame number of a system frame in which an SPS resource specified in the DCI is located: $slot_{start\ time}$ is a time slot number in a corresponding system frame for the SPS resource specified in the specified DCI: and periodicity is an SPS periodicity (or referred to as a resource periodicity) configured in RRC signaling.

Because a length of the SFN is 10 bits and can indicate a value from 0 to 1023, for a next radio frame of a radio frame of an SFN of 1023, a corresponding SFN value is 0. Because the SPS periodicity is divisible by 10240 ms (that is, with a length being 1024 radio frames), positions at which SPS resources occur in radio frames of the same SFN obtained through calculation by using the foregoing formula (1) are the same.

2. Method for Determining a HARQ Process

For a specific SPS resource, the terminal device determines an identifier (ID) of the HARQ process by using the following formula (2), to determine to use a specific HARQ process for processing or using the SPS resource, that is, determining a HARQ process ID associated with the SPS resource:

$$HARQ\ Process\ ID = [floor(CURRENT\_slot*10/(numberOfSlotsPerFrame*periodicity))]\ modulo\ nrofHARQ\text{-}Processes \quad \text{formula (2)},$$

where HARQ Process ID is an identifier of a determined HARQ process: floor represents a round-down function: nrofHARQ-Processes is a quantity of configured HARQ processes: and CURRENT_slot is a time domain start position of the downlink SPS resource, and CURRENT_slot= (SFN*numberOfSlotsPerFrame)+slot number in the frame.

II. Uplink Direction

1. Method for Determining a Position of a Configured Periodic Resource 1.1 CG Type 1

For the CG type 1, the terminal device determines a time domain position of the $N^{th}$ CG type 1 resource by using the following formula (3), that is, the $N^{th}$ CG type 1 resource starts from which symbol of which slot of which SFN, or it can be understood as: If (SFN, slot number in the frame, symbol number in the slot) satisfies the following formula (3), the terminal device determines (SFN, slot number in the frame, symbol number in the slot) as the time domain position of the CG type 1 resource:

(SFN*numberOfSlotsPerFrame*numberOfSymbolsPerSlot+
(slot number in the
frame*numberOfSymbolsPerSlot)+symbol number in the slot)=
(timeDomainOffset*numberOfSymbolsPerSlot+
S+N*periodicity)modulo
(1024*numberOfSlotsPerFrame*numberOfSymbolsPerSlot),
N=1,2,3, . . .    formula (3), where a value range of SFN is 0, 1, 2, . . . , 1023: a value range of slot number in the frame is 0, 1, 2, . . . , numberOfSlotsPerFrame−1: a value range of symbol number in the slot is 0, 1, 2, . . . , numberOfSymbolsPerSlot−1: numberOfSlotsPerFrame represents a quantity of slots included in one system frame: symbol number in the slot represents a quantity of symbols included in one slot: periodicity is a CG1 periodicity (or referred to as a resource periodicity) configured in the RRC signaling: S indicates that the "first" configured uplink grant configured in the RRC signaling starts from which symbol in one slot: and timeDomainOffset is an offset of the "first" configured uplink grant relative to a time point of an SFN of 0, where the offset is in units of slots.

In another implementation, for the downlink direction, the RRC-based configuration+RRC-based resource indication manner may also be used. A corresponding method for calculating a position of a downlink periodic resource and a calculation method for determining an ID of a HARQ process for processing the corresponding downlink periodic resource may also be the same as the method for the CG type 1 in this embodiment.

1.2 CG Type 2

For the CG type 2, the terminal device determines a time domain position of the $N^{th}$ CG type 2 resource by using the following formula (4), that is, the $N^{th}$ CG type 2 resource starts from which symbol of which slot of which SFN, or it can be understood as: If (SFN, slot number in the frame, symbol number in the slot) satisfies the following formula (4), the terminal device determines (SFN, slot number in the frame, symbol number in the slot) as the time domain position of the CG type 2 resource:

(SFN*numberOfSlotsPerFrame*numberOfSymbolsPerSlot+
(slot number in the
frame*numberOfSymbolsPerSlot)+symbol number in the slot)=
[(numberOfSlotsPerFrame*numberOfSymbolsPerSlot*
$SFN_{start\ time}$+$slot_{start\ time}$*
numberOfSymbolsPerSlot+$symbol_{start\ time}$)+
N*periodicity]modulo
(1024*numberOfSlotsPerFrame*numberOfSymbolsPerSlot),
N=1, 2, 3, . . .    formula (4), where a value range of SFN is 0, 1, 2, . . . , 1023: a value range of slot number in the frame is 0, 1, 2, . . . , numberOfSlotsPerFrame−1: a value range of symbol number in the slot is 0, 1, 2, . . . , numberOfSymbolsPerSlot−1: numberOfSlotsPerFrame represents a quantity of slots included in one system frame: symbol number in the slot represents a quantity of symbols included in one slot: periodicity is a CG2 periodicity (or referred to as a resource periodicity) configured in the RRC signaling: $SFN_{start\ time}$ is a system frame number of a system frame in which the "first" configured uplink grant is located: $slot_{start\ time}$ is a slot number of the "first" configured uplink grant in the corresponding system frame: and $symbol_{start\ time}$ is a symbol number of the "first" configured uplink grant in the corresponding system frame.

For the configured grant (CG type 1 or CG type 2), because a configured periodicity of the configured grant is divisible by 10240 ms, time-frequency domain positions obtained through calculation by using the foregoing formula (3) or (4) of configured grant resources in all radio frames of the same SFN are the same.

2. Method for Determining a HARQ Process

For a specific configured uplink grant resource (a CG type 1 resource or a CG type 2 resource), the terminal device determines an identifier (ID) of a HARQ process by using the following formula (5), to determine to use a specific HARQ process for processing or using the CC type 1 resource or CG type 2 resource, that is, determining a HARQ process ID associated with the CC type 1 resource or a CG type 2 resource:

HARQ Process ID=[floor(CURRENT_symbol/periodicity)]modulo nrofHARQ-Processes    formula (5), where HARQ Process ID is an identifier of a determined HARQ process: floor represents a round-down function: nrofHARQ-Processes is a quantity of configured HARQ processes: and CURRENT_symbol is a time domain start position of the configured uplink grant resource, and CURRENT_symbol=
(SFN*numberOfSlotsPerFrame*numberOfSymbolsPerSlot+
slot number in the frame*numberOfSymbolsPerSlot+
symbol number in the slot).

In the prior art described above, configuration of a specific SPS/CG periodicity can be supported, that is, the periodicity needs to be divisible by 10240 ms, to ensure that a resource position required by the terminal device matches an SPS/CG resource position obtained through calculation by using the formula (namely, the formula (1), the formula (3), or the formula (4)) in the radio frames of the same SFN.

If the periodicity of the configured SPS/CG is indivisible by 10240 ms, for example, the periodicity of the configured SPS/CG is 3 ms, 1.6 ms, or the like, the periodicity is indivisible by 10240 ms in this case. When an SPS resource with the 3 ms or 1.6 ms periodicity needs to be configured to match data transmission of a periodic downlink service for the terminal device, if the terminal device still calculates a position of the SPS/CG resource according to the foregoing formula (1), formula (3), or formula (4) in this case, after the SFN wraps around (from 1023 to 0), in a new SFN periodicity, there is a deviation between the SPS/CG resource position determined according to the foregoing formula (1), formula (3), or formula (4) and an actually required downlink/uplink resource position. As a result, transmission requirements of some high-reliability low-latency services cannot be satisfied.

Figure 2:
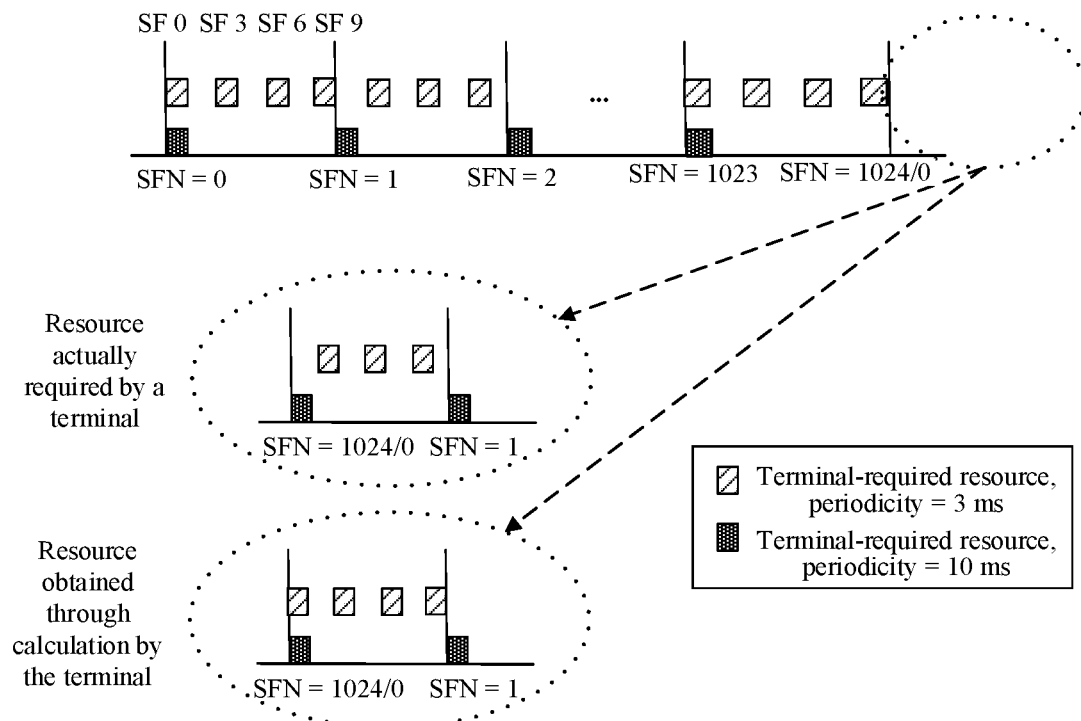
FIG. 2 is a schematic diagram of inconsistency between a resource position determined by a terminal device and a resource position required by the terminal device according to this application.

FIG. 2 is a schematic diagram of a periodic resource position required by a terminal device. Two resource periodicities are shown in the figure: one is 10 ms, and the other is 3 ms, where 10 ms is divisible by 10240 ms, and therefore there is no deviation between the resource position determined by the terminal device and the actual resource position. However, for a periodicity indivisible by 10240 ms, the periodicity of 3 ms is used as an example. It can be learned that, when the SFN wraps around, there is a deviation between the resource position actually required by the terminal device and the resource position obtained through calculation by the terminal device according to the foregoing formula: as a result, transmission requirements of some high-reliability low-latency services cannot be satisfied. Specifically, a time domain interval of the transmission resource required by the terminal device is 3 ms. However, when the resource position is obtained through calculation by using the foregoing formula, a time domain interval between two periodic resources before and after the SFN wraps around is 1 ms.

To resolve the foregoing problem, this application provides a plurality of different methods, which are separately described below.

Embodiment 1

In this embodiment, a resource periodicity is indivisible by 10240 ms, but is divisible by symbol/slot/ms. In an example, the resource periodicity is divisible by ms, for example, the resource periodicity may be 3 ms, 6 ms, 15 ms, or the like.

A network device may configure at least one SPS/CG for a terminal device. Each SPS/CG is configured with a value of K and a counter value is maintained. During SPS/CG configuration on a network, a value of K may be additionally indicated explicitly in configuration signaling. The value of K may represent a value range of a maintained counter value for a corresponding SPS/CG. For example, when a counter is counted from 0, the counter value range is 0, 1, 2, . . . , K−1. Certainly, the counter value range may be represented in other manners, for example, the counter value range is 1, 2, 3, . . . , K. Specifically, the counter value range may start from an arbitrary number to the arbitrary number+K−1 (the arbitrary number is denoted by t, and the counter value range is t, t+1, t+2, . . . , t+K−1). Optionally, the value of K may be explicitly indicated in RRC signaling or be implicitly indicated in a manner similar to the following: K may be a minimum positive integer satisfying the following condition: K*10240 ms=Integer multiple of periodicity. For example, when periodicity=15 ms, K=3. The counter value may be maintained by a media access control (MAC) layer entity of the terminal device, or be maintained by an RRC layer entity of the terminal device.

When the network activates one SPS/CG configuration by using DCI, a corresponding counter of the SPS/CG configuration is reset to 0. When an SFN wraps around, that is, one radio frame corresponds to an SFN of 1023, and an SFN corresponding to a next radio frame wraps around to 0, the corresponding counter value is updated in the following manner: counter=(counter+1) modulo K. To be specific, when the SFN wraps around, the counter value is incremented by 1, and a modulo operation is performed on an incremented result to avoid exceeding an allowable value range.

Based on this embodiment, a method for determining a position of a configured periodic resource and a method for determining a to-be-used HARQ process are described as follows.

I. Downlink Direction

1. Method for Determining a Position of a Configured Periodic Resource

In radio frames of SFNs of 0 to 1023, during determining of a position of a periodic resource, the terminal device needs to consider a counter value and a value of K, for example, to determine a time domain position of an $N^{th}$ SPS resource by using the following formula (6), that is, the $N^{th}$ SPS resource occurs in a specific slot of a specific SFN, or it can be understood as: If (SFN, slot number in the frame) satisfies the following formula (6), the terminal device determines that the (SFN, slot number in the frame) is the time domain position of the downlink SPS resource (the SPS resource occupies an integer quantity of slots):

(numberOfSlotsPerFrame*(SFN+counter*1024)+slot number in the frame)=
[(numberOfSlotsPerFrame*SFN$_{start\ time}$+slot$_{start\ time}$)+
N*periodicity*numberOfSlotsPerFrame/10]
modulo(1024*K*numberOfSlotsPerFrame)    formula (6), where the counter value and the value of K are defined as above. For definitions of other parameters, refer to related definitions in the formula (1). Details are not described herein again.

2. Method for Determining a HARQ Process

For a specific SPS resource, the terminal device determines an identifier (ID) of a HARQ process by using the following formula (7), to determine to use a specific HARQ process for processing or using the SPS resource, that is, determining a HARQ process ID associated with the SPS resource:

HARQ Process ID=[floor(CURRENT_slot*10/
 (numberOfSlotsPerFrame*periodicity))]modulo
 nrofHARQ-Processes    formula (7), where HARQ Process ID is an identifier of a determined HARQ process: floor represents a round-down function: nrof-HARQ-Processes is a quantity of configured HARQ processes used for processing the SPS resource: and CURRENT_slot is a time domain start position of the downlink SPS resource, and CURRENT_slot=((SFN+counter*1024)*numberOfSlotsPerFrame)+slot number in the frame.

In another implementation, the HARQ process ID may alternatively be calculated in the manner described in the foregoing formula (2).

When the terminal device is configured with a plurality of SPS configurations and the plurality of SPS configurations are activated simultaneously, according to the foregoing formula (7), all HARQ processes available for SPS resources of different SPS configurations start from 0, which may affect data transmission using the SPS resources. For example, two resources of an SPS configuration 1 and an SPS configuration 2 arrive at an interval of one slot. After receiving and processing on the resource of the SPS configuration 1 by using a HARQ process 0 data scheduled by the base station, the terminal device does not parse the data successfully due to relatively poor channel quality, and requires the base station to retransmit the data, to combine the retransmitted data and previous data for decoding. However, the terminal device also needs to use the HARQ process 0 to process the resource that is of the SPS configuration 2 and that arrives soon, and therefore data stored in a buffer corresponding to the HARQ process 0 is cleared. To reduce the foregoing problem, HARQ processes available for different SPS configurations may be distinguished. Therefore, in still another implementation of determining the HARQ process for processing the SPS resource, the HARQ process ID may alternatively be calculated by using the following formula (7a):

HARQ Process ID=[floor(CURRENT_slot*10/
 (numberOfSlotsPerFrame*periodicity))]modulo
 nrofHARQ-Processes+Δ    formula (7a), where during configuration of each SPS/CG, a corresponding index value ConfigurationIndex may be indicated in the configuration signaling, for example, the index value may be 0, 1, 2, . . . . CURRENT_slot= [(SFN*numberOfSlotsPerFrame)+slot number in the frame] is a time domain start position of the SPS resource. Δ may be determined in one of the following manners:

Manner 1: Δ=ConfigurationIndex*nrofHARQ-Processes. For example, ConfigurationIndex=1 and nrofHARQ-Processes=2 in the current SPS/CG configuration, and then Δ=2.

Manner 2: Δ=Sum of nrofHARQ-Processes of all SPS/CG configurations whose index values are less than ConfigurationIndex corresponding to the current SPS/CG. For example, two SPSs are configured on the network, and correspond to index values of 0 and 1 respectively and nrofHARQ-Processes of 2 and 3 respectively. Then, for a resource of the first SPS configuration, there is no SPS configuration with an index value less than 0, and therefore the corresponding Δ is 0. For a resource of the second SPS configuration, an SPS configuration with an index value less than 1 is the first SPS configuration, and therefore the corresponding Δ is 2.

Optionally, to prevent the HARQ process ID obtained through calculation in this manner from exceeding a maximum value of the HARQ process ID, a modulo operation may be performed on the HARQ process ID obtained through calculation (for example, a modulo operation is performed on a maximum quantity of downlink HARQ processes or a quantity of HARQ processes that can be used by the terminal device in a current cell).

In yet another implementation, the HARQ process ID may alternatively be calculated in the manner described in the foregoing formula (7b):

$$\text{HARQ Process ID} = [\text{floor}(\text{CURRENT\_slot}*10/(\text{numberOfSlotsPerFrame}*\text{periodicity}))] \text{modulo nrofHARQ-Processes} + \Delta \quad \text{formula (7b)},$$

where CURRENT_slot is a time domain start position of the downlink SPS resource, and CURRENT_slot=((SFN+counter*1024)*numberOfSlotsPerFrame)+slot number in the frame. Δ is the same as that in formula (7a).

Optionally, to prevent the HARQ process ID obtained through calculation in this manner from exceeding the maximum value of the HARQ process ID, a modulo operation may be performed on the HARQ process ID obtained through calculation (for example, a modulo operation is performed on the maximum quantity of downlink HARQ processes or a quantity of downlink HARQ processes that can be used by terminal device in the current cell).

II. Uplink Direction

1. Method for Determining a Position of a Configured Periodic Resource 1.1 CG Type 1

For the CG type 1, during determining of a position of a periodic resource, the terminal device needs to consider a counter value and a value of K, for example, to determine a time domain position of the $N^{th}$ CG type 1 resource by using the following formula (8), that is, the $N^{th}$ CG type 1 resource starts from which symbol of which slot of which SFN, or it can be understood as: If (SFN, slot number in the frame, symbol number in the slot) satisfies the following formula (8), the terminal device determines (SFN, slot number in the frame, symbol number in the slot) as the time domain position of the CG type 1 resource:

$$((SFN+\text{counter}*1024)*\text{numberOfSlotsPerFrame}*\text{numberOfSymbolsPerSlot}+$$
$$(\text{slot number in the frame}*\text{numberOfSymbolsPerSlot})+\text{symbol number in the slot})=$$
$$(\text{timeDomainOffset}*\text{numberOfSymbolsPerSlot}+S+N*\text{periodicity})\text{modulo}$$
$$(1024*K*\text{numberOfSlotsPerFrame}*\text{numberOfSymbolsPerSlot}),$$
$$N=1, 2, 3, \ldots \quad \text{formula (8), where}$$

the counter value and the value of K are defined as above.

For definitions of other parameters, refer to related definitions in the formula (3). Details are not described herein again.

In another implementation, for the downlink direction, the RRC-based configuration+RRC-based resource indication manner may also be used. A corresponding method for calculating a position of a downlink periodic resource and a calculation method for determining an ID of a HARQ process for processing the corresponding downlink periodic resource may also be the same as the method for the CG type 1 in this embodiment.

1.2 CG Type 2

For the CG type 2, during determining of a position of a periodic resource, the terminal device needs to consider a counter value and a value of K, for example, to determine a time domain position of the $N^{th}$ CG type 2 resource by using the following formula (9), that is, the $N^{th}$ CG type 2 resource starts from which symbol of which slot of which SFN, or it can be understood as: If (SFN, slot number in the frame, symbol number in the slot) satisfies the following formula (9), the terminal device determines (SFN, slot number in the frame, symbol number in the slot) as the time domain position of the CG type 2 resource:

$$((SFN+\text{counter}*1024)$$
$$*\text{numberOfSlotsPerFrame}*\text{numberOfSymbolsPerSlot}+$$
$$(\text{slot number in the frame}*\text{numberOfSymbolsPerSlot})+\text{symbol number in the slot})=$$
$$[(\text{numberOfSlotsPerFrame}*\text{numberOfSymbolsPerSlot}*SFN_{start\ time}+\text{slot}_{start\ time}*\text{numberOfSymbolsPerSlot}+\text{symbol}_{start\ time})+$$
$$N*\text{periodicity}]\text{modulo}$$
$$(1024*K*\text{numberOfSlotsPerFrame}*\text{numberOfSymbolsPerSlot}),$$
$$N=1, 2, 3, \ldots \quad \text{formula (9), where}$$

the counter value and the value of K are defined as above.

For definitions of other parameters, refer to related definitions in the formula (4). Details are not described herein again.

When a time domain position occupied by one SPS resource may be less than one slot, for example, may be 2/7 symbols, the time domain position of an $N^{th}$ SPS resource may be determined by using the formula (9).

2. Method for Determining a HARQ Process

For a specific configured uplink grant resource (a CG type 1 resource or a CG type 2 resource), the terminal device determines an identifier (ID) of a HARQ process by using the following formula (10), to determine to use a specific HARQ process for processing or using the CG type 1 resource or CG type 2 resource, that is, determining a HARQ process ID associated with the CG type 1 resource or a CG type 2 resource:

$$\text{HARQ Process ID} = [\text{floor}(\text{CURRENT\_symbol}/\text{periodicity})] \text{modulo nrofHARQ-Processes} \quad \text{formula (10), where}$$

HARQ Process ID is an identifier of a determined HARQ process: floor represents a round-down function: nrofHARQ-Processes is a quantity of configured HARQ processes: and CURRENT_symbol is a time domain start position of the configured uplink grant resource, and CURRENT_symbol=((SFN+counter*1024)*numberOfSlotsPerFrame*numberOfSymbolsPerSlot+slot number in the frame*numberOfSymbolsPerSlot+symbol number in the slot).

In another implementation, the HARQ process ID may alternatively be calculated in the manner described in the foregoing formula (5).

In still another implementation, the HARQ process ID may alternatively be calculated in the manner described in the foregoing formula (7a), where CURRENT_slot in the formula (7a) needs to be replaced with CURRENT_symbol=
(SFN*numberOfSlotsPerFrame*numberOfSymbolsPerSlot+ slot number in the frame*numberOfSymbolsPerSlot+ symbol number in the slot). To prevent the HARQ process ID obtained through calculation in this manner from exceeding the maximum value of the HARQ process ID, a modulo operation may be performed on the HARQ process ID obtained through calculation (for example, a modulo operation is performed on the maximum quantity of uplink HARQ processes or a quantity of uplink HARQ processes that can be used by terminal device in the current cell).

In yet another implementation, the HARQ process ID may alternatively be calculated in the manner described in the foregoing formula (7b), where CURRENT_slot in the formula (7b) needs to be replaced with CURRENT_symbol=((SFN+counter*1024)
*numberOfSlotsPerFrame*numberOfSymbolsPerSlot+slot number in the frame*numberOfSymbolsPerSlot+symbol number in the slot). To prevent the HARQ process ID obtained through calculation in this manner from exceeding the maximum value of the HARQ process ID, a modulo operation may be performed on the HARQ process ID obtained through calculation (for example, a modulo operation is performed on the maximum quantity of uplink HARQ processes or a quantity of uplink HARQ processes that can be used by terminal device in the current cell).

When a time domain position occupied by one SPS resource may be less than one slot, for example, may be 2/7 symbols, an identifier of a HARQ process for processing a specific SPS resource may be determined in one of the foregoing several optional manners.

For the CG type 1 or the CG type 2, when the terminal device receives a CG configured by using RRC dedicated signaling, the terminal device sets a corresponding counter value to 0, and then the counter value is processed and a resource position of the configured uplink grant is determined in the manner described above.

Based on this embodiment, for each SPS/CG configuration, one value of K is configured and one counter value is maintained: and the SPS/CG resource position is calculated based on the counter value and K. After the network configures an SPS/CG resource based on characteristics of a periodic service, a resource position required based on the service characteristics by the terminal device is consistent with a network-configured resource position determined according to the formula (for example, the formula (6), (8), or (9)), which is not affected by the SEN wraps around. The network may configure a periodicity to be any integer multiple of symbol/slot/ms.

Embodiment 2

In this embodiment, a resource periodicity is indivisible by 10240 ms, but is divisible by symbol/slot/ms. In an example, the resource periodicity is divisible by ms, for example, the resource periodicity may be 3 ms, 6 ms, 15 ms, or the like.

A main difference between this embodiment and the foregoing Embodiment 1 lies in that a value of K is predefined by the protocol and may be configured per MAC/per cell, that is, is configured at a MAC granularity or a cell granularity.

A counter value range is predefined by the protocol, or configured per MAC entity/per cell by using RRC signaling. The counter value range configured per MAC entity means that one MAC entity has one counter value range, and all periodic resource configurations maintained by the MAC entity correspond to a same counter value range. The counter value range configured per cell means that one serving cell of the terminal device has one counter value range, and periodic resource configurations configured in the serving cell correspond to a same counter value range. Using per cell configuration as an example, the network configures, by using RRC signaling, a length of a counter maintained for SPS/CGs in one cell as L bits, and then value ranges of all counter values maintained for the SPS/CGs in the cell are 0, 1, 2, ..., K−1: and K=24. Optionally, the network may configure a quantity of counter values maintained for SPS/CGs in one cell as K, and then value ranges of all counter values maintained for the SPS/CGs in the cell are 0, 1, 2, ..., K−1. Certainly, the counter value range may be represented in other manners, for example, the counter value range is 1, 2, 3, ..., K. Specifically, the counter value range may start from an arbitrary number to the arbitrary number+ K−1 (the arbitrary number is denoted by t, and the counter value range is t, t+1, t+2, ..., t+K−1).

Compared with Embodiment 1, the same K is configured for all the SPS/CGs in the cell. However, in Embodiment 1, one value of K is configured for each SPS/CG.

The counter value may be maintained by a MAC layer entity of the terminal device, or may be maintained by an RRC layer entity of the terminal device.

When the network activates one SPS/CG configuration by using DCI, a corresponding counter of the SPS/CG configuration is reset to 0. When an SFN wraps around, that is, one radio frame corresponds to an SFN of 1023, and an SFN corresponding to a next radio frame wraps around to 0, the corresponding counter value is updated in the following manner: counter=(counter+1) modulo K. To be specific, when the SFN wraps around, the counter value is incremented by 1, and a modulo operation is performed on the incremented result to avoid exceeding an allowable value range.

Based on this embodiment, a method for determining a position of a configured periodic resource and a method for determining a to-be-used HARQ process are the same as formula (6) to formula (10) in the foregoing Embodiment 1, and reference may be made to the foregoing descriptions. However, a definition of K is different, for example, K in Embodiment 2 is configured per cell and is equal to 24, while K in Embodiment 1 is a minimum positive integer satisfying the following condition: K*10240 ms=Integer multiple of periodicity.

Based on this embodiment, one counter value is maintained for each SPS/CG, and the counter value range K per MAC/cell is predefined or configured, for example, a same value of L or value of K is configured based on the MAC granularity or cell granularity, and K=24. In this embodiment, during the SFN wraps around, there is still a mismatch between an SPS/CG resource position obtained through calculation by using the foregoing formula (6), (8), or (9) and a resource position required by the terminal device. However, compared with a prior-art calculation method in which such case occurs once for every 1024 radio frames, the calculation method in Embodiment 2 can make the case occur once for every 1024*L radio frames, thereby effectively decreasing an occurrence frequency of mismatch. In addition, in this method, the terminal device maintains the counter value based on the MAC granularity or the cell granularity, with no need to maintain the counter value for each SPS/CG. Therefore, implementation complexity is relatively low for the terminal device.

Embodiment 3

In this embodiment, a resource periodicity is indivisible by 10240 ms, but is divisible by symbol/slot/ms. In an example, the resource periodicity is divisible by ms, for example, the resource periodicity may be 3 ms, 6 ms, 15 ms, or the like.

A main difference between this embodiment and the foregoing Embodiment 1 lies in that a hyper-system frame number (H-SFN) is introduced and used along with an SFN to determine an SPS/CG resource position. This is equivalent to that the terminal device maintains the H-SFN, instead of maintaining a counter value per SPS/CG.

A base station broadcasts the H-SFN by using SIB signaling, and the H-SFN is incremented by 1 for every 1024 radio frames. For example, if the H-SFN is M bits in length, <H-SFN,SFN> may identify $102*2^M$ radio frames, where $K=2^M$ can be defined.

Based on this embodiment, a method for determining a position of a configured periodic resource and a method for determining a to-be-used HARQ process are described as follows.

I. Downlink Direction

1. Method for Determining a Position of a Configured Periodic Resource

In radio frames of SFNs of 0 to 1023, the terminal device determines a time domain position of an $N^{th}$ SPS resource by using the following formula (11), that is, the $N^{th}$ SPS resource occurs in a specific slot of a specific SFN, or it can be understood as: If (H-SFN, SFN, slot number in the frame) satisfies the following formula (11), the terminal device determines that the (H-SFN, SFN, slot number in the frame) is the time domain position of the downlink SPS resource (the SPS resource occupies an integer quantity of slots):

$$(numberOfSlotsPerFrame*(SFN+H-SFN*1024)+slot\ number\ in\ the\ frame) = [(numberOfSlotsPerFrame*(SFN_{start\ time}+H-SFN_{start\ time}*1024)+slot_{start\ time})+N*periodicity*numberOfSlotsPerFrame/10]\ modulo(1024*K*numberOfSlotsPerFrame)\ \ \text{formula (11)},$$

where a value of H-SFN and a value of K are defined as above. $H-SFN_{start\ time}$ is a hyper-system frame number of the first SPS resource that is specified. For definitions of other parameters, refer to related definitions in the formula (1). Details are not described herein again.

2. Method for Determining a HARQ Process

For a specific SPS resource, the terminal device determines an identifier (ID) of the HARQ process by using the following formula (12), to determine to use a specific HARQ process for processing or using the SPS resource, that is, determining a HARQ process ID associated with the SPS resource:

$$HARQ\ Process\ ID=[floor(CURRENT\_slot*10/(numberOfSlotsPerFrame\ periodicity))]modulo\ nrof-HARQ-Processes \ \ \text{formula (12)},$$

where HARQ Process ID is an identifier of a determined HARQ process: floor represents a round-down function: nrof-HARQ-Processes is a quantity of configured HARQ processes: and CURRENT_slot is a time domain start position of the downlink SPS resource, and CURRENT_slot=((SFN+H-SFN*1024)*numberOfSlotsPerFrame)+slot number in the frame.

In another implementation, the HARQ process ID may alternatively be calculated in the manner described in the foregoing formula (2).

In still another implementation, the HARQ process ID may alternatively be calculated in the manner described in the foregoing formula (7a).

In yet another implementation, the HARQ process ID may alternatively be calculated in the manner described in the foregoing formula (7b), where CURRENT_slot=((SFN+H-SFN*1024)*numberOfSlotsPerFrame)+slot number in the frame.

II. Uplink Direction

1. Method for Determining a Position of a Configured Periodic Resource 1.1 CG Type 1

For the CG type 1, the terminal device determines a time domain position of the $N^{th}$ CG type 1 resource by using the following formula (13), that is, the $N^{th}$ CG type 1 resource starts from which symbol of which slot of which SFN, or it can be understood as: If (H-SFN, SFN, slot number in the frame, symbol number in the slot) satisfies the following formula (13), the terminal device determines (H-SFN, SFN, slot number in the frame, symbol number in the slot) as the time domain position of the CG type 1 resource:

$$((SFN+H-SFN*1024)\\ *numberOfSlotsPerFrame*numberOfSymbolsPerSlot+\\ (slot\ number\ in\ the\ frame*numberOfSymbolsPerSlot)+symbol\ number\ in\ the\ slot)=\\ (timeDomainOffset*numberOfSymbolsPerSlot+\\ S+N*periodicity)\ modulo\\ (1024*K*numberOfSlotsPerFrame*numberOfSymbolsPerSlot),\\ N=1,2,3,\ldots \ \ \text{formula (13)},$$

where a value of H-SFN and a value of K are defined as above: and timeDomainOffset is an offset of the "first" configured uplink grant relative to a time point of an H-SFN of 0 and an SFN of 0, where the offset is in units of slots. For definitions of other parameters, refer to related definitions in the formula (3). Details are not described herein again.

For the CG type 1, during CG configuration by using RRC dedicated signaling, timeDomainOffset that is configured is a time domain offset relative to a position with the H-SFN of 0 and the SFN of 0; or the value of H-SFN is indicated in configuration signaling, and timeDomainOffset is a time domain offset relative to a position with an indicated H-SFN and the SFN of 0; or timeDomainOffset is a time domain offset relative to a position with the SFN of 0 for an H-SFN to which a time point of receiving the RRC signaling by the terminal device belongs.

In another implementation, for the downlink direction, the RRC-based configuration+RRC-based resource indication manner may also be used. A corresponding method for calculating a position of a downlink periodic resource and a calculation method for determining an ID of a HARQ process for processing the corresponding downlink periodic resource may also be the same as the method for the CG type 1 in this embodiment.

1.2 CG Type 2

For the CG type 2, the terminal device determines a time domain position of the $N^{th}$ CG type 2 resource by using the following formula (14), that is, the $N^{th}$ CG type 2 resource starts from which symbol of which slot of which SFN, or it can be understood as: If (H-SFN, SFN, slot number in the frame, symbol number in the slot) satisfies the following formula (14), the terminal device determines (H-SFN, SFN, slot number in the frame, symbol number in the slot) as the time domain position of the CG type 2 resource:

$$((SFN+H\text{-}SFN*1024)*\\
\quad numberOfSlotsPerFrame*numberOfSymbolsPerSlot+\\
\quad (slot\ number\ in\ the\\
\quad frame*numberOfSymbolsPerSlot)+symbol\ number\ in\ the\ slot)=\\
\quad [(numberOfSlotsPerFrame*numberOfSymbolsPerSlot*\\
\quad (SFN_{start\ time}+H\text{-}SFN\ start\ time*1024)+\\
\quad slot_{start\ time}*numberOfSymbolsPerSlot+\\
\quad symbol_{start\ time})+N*periodicity]modulo\\
\quad (1024*K*numberOfSlotsPerFrame*numberOfSymbolsPerSlot),\\
\quad N=1,2,3,\ldots \qquad\qquad\qquad \text{formula (14), where}$$

a value of H-SFN value and a value of K are defined as above, and H-SFN$_{start\ time}$ is a hyper-system frame number of the first SPS resource that is specified. For definitions of other parameters, refer to related definitions in the formula (4). Details are not described herein again.

When a time domain position occupied by one SPS resource may be less than one slot, for example, may be 2/7 symbols, the time domain position of an N$^{th}$ SPS resource may be determined by using the formula (14).

2. Method for determining a HARQ process

For a specific configured uplink grant resource (a CG type 1 resource or a CG type 2 resource), the terminal device determines an identifier (ID) of a HARQ process by using the following formula (15), to determine to use a specific HARQ process for processing or using the CC type 1 resource or CG type 2 resource, that is, determining a HARQ process ID associated with the CC type 1 resource or a CG type 2 resource:

$$HARQ\ Process\ ID=[floor(CURRENT\_symbol/periodicity)]modulo\ nrofHARQ\text{-}Processes \quad \text{formula (15), where}$$

HARQ Process ID is an identifier of a determined HARQ process: floor represents a round-down function: nrofHARQ-Processes is a quantity of configured HARQ processes: and CURRENT_symbol is a time domain start position of the configured uplink grant resource, and CURRENT_symbol=((SFN+H-SFN*1024)*numberOfSlotsPerFrame*numberOfSymbolsPerSlot+slot number in the frame*numberOfSymbolsPerSlot+symbol number in the slot).

In another implementation, the HARQ process ID may alternatively be calculated in the manner described in the foregoing formula (5).

In still another implementation, the HARQ process ID may alternatively be calculated in the manner described in the foregoing formula (7a), where CURRENT_slot in the formula (7a) needs to be replaced with CURRENT_symbol=(SFN*numberOfSlotsPerFrame*numberOfSymbolsPerSlot+slot number in the frame*numberOfSymbolsPerSlot+symbol number in the slot). To prevent the HARQ process ID obtained through calculation in this manner from exceeding the maximum value of the HARQ process ID, a modulo operation may be performed on the HARQ process ID obtained through calculation (for example, a modulo operation is performed on the maximum quantity of uplink HARQ processes or a quantity of uplink HARQ processes that can be used by terminal device in the current cell).

In yet another implementation, the HARQ process ID may alternatively be calculated in the manner described in the foregoing formula (7b), where CURRENT_slot in the formula (7b) needs to be replaced with CURRENT_symbol=((SFN+H-SFN*1024)*numberOfSlotsPerFrame*numberOfSymbolsPerSlot+slot number in the frame*numberOfSymbolsPerSlot+symbol number in the slot). To prevent the HARQ process ID obtained through calculation in this manner from exceeding the maximum value of the HARQ process ID, a modulo operation may be performed on the HARQ process ID obtained through calculation (for example, a modulo operation is performed on the maximum quantity of uplink HARQ processes or a quantity of uplink HARQ processes that can be used by terminal device in the current cell).

When a time domain position occupied by one SPS/CG resource may be less than one slot, for example, may be 2/7 symbols, an identifier of a HARQ process for processing a specific SPS/CG resource may be determined in one of the foregoing several optional manners.

In this embodiment, after the H-SFN is introduced, while the SFN wraps around, there is still a mismatch between an SPS/CG resource position obtained through calculation by using the foregoing formula (11), (13), or (14) and a resource position required by the terminal device. However, compared with a prior-art calculation method in which such case occurs once for every 1024 radio frames, the calculation method in Embodiment 3 can make the case occur once for every 1024*2$^M$ radio frames, thereby effectively decreasing an occurrence frequency of mismatch. In addition, in this method, the terminal device maintains the counter value based on the MAC granularity or the cell granularity, with no need to maintain the counter value for each SPS/CG. Therefore, implementation complexity is relatively low for the terminal device.

Embodiment 4

In this embodiment, a periodicity of a resource that the terminal device needs to use is neither divisible by 10240 ms nor divisible by symbol/slot/ms. A periodicity neither divisible by 10240 ms nor divisible by ms is used as an example. For example, the periodicity of the resource that the terminal device needs to use may be 1.6 ms, 1.7 ms, 3.2 ms, or the like.

The following uses an example in which the periodicity of the resource that the terminal device needs to use is 1.6 ms.

Figure 3:
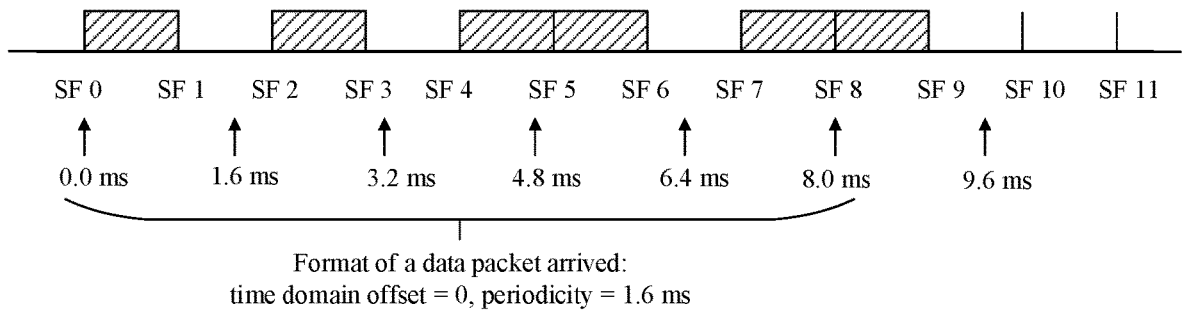
FIG. 3 is a schematic diagram of indicating a resource position by using a bitmap according to this application.

As shown in FIG. 3, for a downlink/uplink traffic pattern of the terminal device, a data packet to be transmitted is generated every 1.6 ms starting from a position with an SFN of 0. Therefore, the terminal device has to-be-transmitted data at positions of 0 ms, 1.6 ms, 3.2 ms, 4.8 ms, 6.4 ms, 8.0 ms, . . . , and so on. The time points of 1.6 ms, 3.2 ms, and the like are not at boundary positions of a slot or symbol, and the network cannot configure periodic SPS/CG resources to strictly match transmission of a downlink/uplink service of the terminal device.

Using downlink SPS as an example, to ensure that each data packet being generated can be transmitted within a specified time, for example, within 1 ms, the network needs to configure SPS resources with a periodicity of 1 ms. However, SPS resources in some subframes cannot be used, for example, in a subframe 1, data arrives in the middle of the subframe 1, and therefore SPS resources in the subframe 1 cannot be used to transmit data. As a result, the SPS configuration with the periodicity of 1 ms causes a resource waste. However, configuring SPS resources with a periodicity of 2 ms may cause data arriving within some subframes to have available SPS resources after 1 ms, resulting in data obsolescence.

A manner of resolving this problem is to configure aperiodic resources in a bitmap manner. A bitmap includes Q bits, each of the Q bits corresponds to one time zone, and each bit is used to indicate whether a resource is configured in the corresponding time zone. The time zone is X slot/symbol/ms, where X is a positive integer, and the terminal device determines a configured resource based on the bitmap.

For example, using FIG. 3 as an example, in eight subframes starting from a subframe 0, downlink transmission resources are configured in subframes 0, 2, 4, 5, and 7. A resource configuration status in the eight subframes is denoted as {10101101} by using a bitmap of eight bits. '1' indicates that a downlink transmission resource is configured in a corresponding subframe, and '0' indicates that a downlink transmission resource is not configured in a corresponding subframe. For eight subframes starting from a subframe 8, a resource configuration status may also be represented as {10101101}. Therefore, the resource configuration status is repeated every eight subframes. In this resource configuration status, it can be ensured that a resource configured in a most recent usable subframe is available for each piece of generated data.

Therefore, in this method, the resources represented by the bitmap occur periodically, and the resource represented by each bit in the bitmap occurs aperiodically. When the resource configuration in the bitmap manner is configured by using RRC, the following may be indicated: timeDomainOffset between a start position of the first bitmap and the SFN of 0, a quantity of available HARQ processes nrofHARQ-Processes, and a time length indicated by each bit, which may be, for example, 1 slot/symbol/ms or 3 slot/ms. Under this configuration, the terminal device does not determine the downlink configured resource position according to a formula (for example, the formulas in the foregoing Embodiment 1, or Embodiment 2, or Embodiment 3), but considers that the resources represented by the bitmaps occur periodically from the start position of the first bitmap, where the periodicity is a time domain length represented by the bitmap.

For HARQ processes that process downlink resources, the terminal device may use HARQ processes 0, 1, . . . , and nrofHARQ-Processes−1 through polling for successively occurring downlink transmission resources starting from the first downlink transmission resource indicated in the bitmap manner. Optionally, the terminal device itself may alternatively select a HARQ process and indicate the HARQ process to the network (NW) in an uplink control signaling (UCI) manner.

The bitmap manner may alternatively be combined with the solutions of the foregoing Embodiments 1 to 3. The terminal device may determine a start position of a bitmap within each SFN in the manners of Embodiments 1 to 3, where the periodicity is the time domain length represented by the bitmap. For example, bitmap={101}, each bit indicates 1 slot, and timeDomainOffset=0. In this case, the terminal device may consider the periodicity as 3 slots, then in a current radio frame of the SFN of 0, the terminal device may determine, according to Embodiment 1, that subframes 0/3/6/9 each represent a start position of one bitmap.

The resources are configured for the terminal device in the bitmap manner, to support a transmission requirement of a service whose data is generated based on a periodicity of a non-integer quantity of symbol/slot/ms, thereby reducing a resource waste caused by a periodic SPS/CG resource configuration manner in the foregoing Embodiments 1 to 3, or reducing a case in which a transmission requirement of some service data cannot be satisfied. The resources are configured for the terminal device in the bitmap manner, so that the resources represented by the bitmaps occur periodically, and the resource represented by each bit in the bitmap occurs aperiodically.

Embodiment 5

In this embodiment, a periodicity of a resource that the terminal device needs to use is neither divisible by 10240 ms nor divisible by symbol/slot/ms. A periodicity neither divisible by 10240 ms nor divisible by ms is used as an example. For example, the periodicity of the resource that the terminal device needs to use may be 1.6 ms, 1.7 ms, 3.2 ms, or the like.

In this embodiment, the terminal device determines a validity position of a configured resource based on a resource periodicity, and determines the configured resource based on the validity position.

Figure 4:
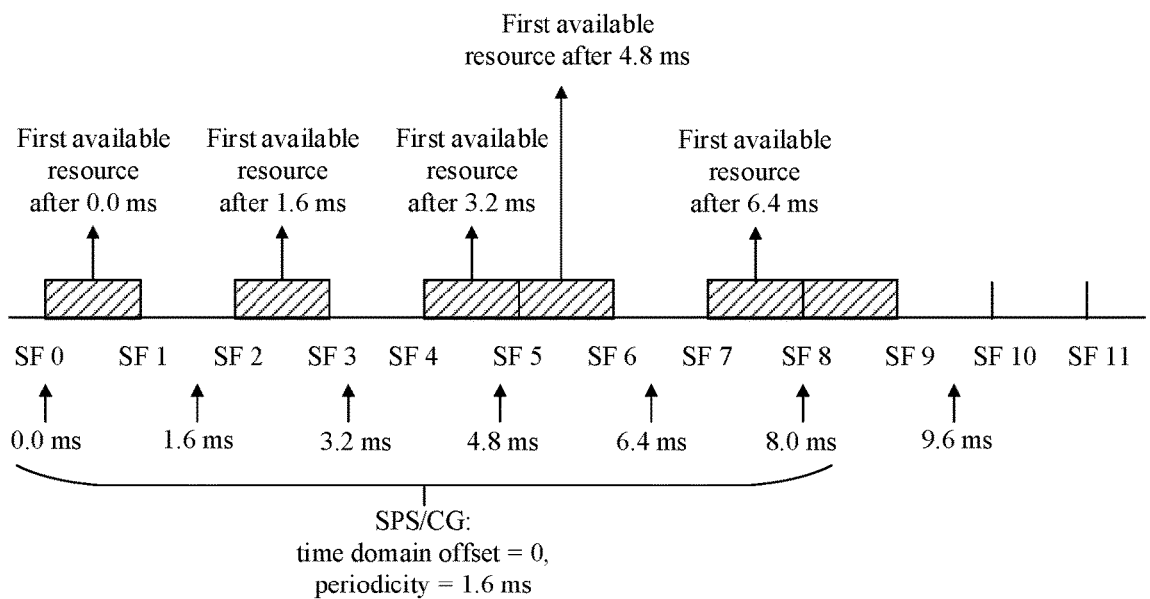
FIG. 4 is a schematic diagram of a method for determining a resource position according to this application.

The following uses an example in which the periodicity of the resource that the terminal device needs to use is 1.6 ms. As shown in FIG. 4, an SPS/CG periodicity configured by using RRC may be a non-integer quantity of slots, and the terminal device determines a next qualified resource as an SPS/CG resource from a periodic time point.

During SPS/CG configuration on the network, the periodicity may be a non-integer quantity of symbol/slot/ms, for example, the periodicity may be configured to be 1.6 slot/ms. As shown in FIG. 4 (in the figure, 1 ms=1 slot), when the network indicates the SPS/CG resource, the first resource that is indicated is in a subframe 0, a time domain length of the resource is one slot (for example, for the CG type 1, parameters of a time domain position of the resource indicated by the RRC are configured as S=0 and L=14), and periodicity=1.6 ms. In this case, the second SPS/CG resource occurs after a time point with a time domain offset of 1.6 ms relative to the SFN of 0, and is the first available transmission resource meeting the condition. For example, in this example, the first available transmission resource after the time point of 1.6 ms is as follows:

For SPS/CG type 2, the first available transmission resource after the time point of 1.6 ms is the first downlink/uplink resource starting from a slot boundary and occupying a one-slot length after 1.6 ms, and a frequency domain position is the same as a frequency domain position of the first resource indicated in a DCI activation command. Herein, the slot boundary from which the first downlink/uplink resource starts after 1.6 ms is a validity position.

For the CG type 1, the first available transmission resource after the time point of 1.6 ms is the first uplink resource with S of 0 and L of 14 after 1.6 ms, and a frequency domain position is the same as a frequency domain position of the first resource indicated in RRC configuration information. Herein, a position of the first uplink resource with S of 0 and L of 14 after 1.6 ms is a validity position.

For one SPS/CG resource, the terminal device may determine a HARQ process ID in the manner of the foregoing formula (2) in the prior art. Optionally, the HARQ process ID may alternatively be calculated in the following manner:

HARQ Process ID=[floor(CURRENT_start_time/periodicity)]modulo nrofHARQ-Processes formula (16), where CURRENT_start_time is the first available transmission resource after a time point relative to a position of the SFN of 0 for the SPS/CG resource. For example, FIG. 4 is used as an example, CURRENT_start_time corresponding to the fourth SPS/CG resource is 4.8 ms. Optionally, the terminal device may use HARQ processes 0, 1, . . . , and nrofHARQ-Processes−1 through polling for successively occurring SPS/CG resources. Optionally, the terminal device itself may alternatively select a HARQ process and indicate the HARQ process to the NW in an uplink control information (UCI) manner. The UCI may carry HARQ process ID information, and a time-frequency resource position for transmitting the UCI may be configured by the network device. For example, during configuration of each SPS/CG resource, a time-frequency domain resource position of associated UCI is configured in configuration signaling. Optionally, the time-frequency domain resource position for transmitting the UCI may have a predefined function relationship with a corresponding SPS/CG resource position. For example, after data transmission is performed on a determined SPS/CG resource, the terminal device determines, based on an SPS/CG resource position and a predefined functional relationship, a time-frequency domain resource position for transmitting the UCI.

This embodiment may also be combined with the solutions of the foregoing Embodiment 1 to Embodiment 3, for example, the terminal device determines an appropriate time point within each SFN based on a periodicity and a time domain position of the first resource that are indicated in DCI/RRC. For example, for the CG type 1, timeDomain-Offset=0 and periodicity=1.6 ms. Then, in the current radio frame of the SFN of 0, the terminal device may determine 0 ms, 1.6 ms, 3.2 ms, 4.8 ms, 6.4 ms, 8.0 ms, and 9.6 ms as appropriate time points according to Embodiment 1, and the first available transmission resources after these time points are SPS/CG resources that can be used by the terminal device.

In this embodiment, an SPS/CG periodicity configured by using RRC may be a non-integer quantity of symbol/slot/ms, and the terminal device determines a next qualified resource as an SPS/CG resource from a periodic time point. In this manner, a transmission requirement of a service whose data is generated based on a periodicity of a non-integer quantity of symbol/slot/ms can be supported, thereby reducing a resource waste caused by existing periodic SPS/CG resource configuration, or reducing a case in which a transmission requirement of some service data cannot be satisfied.

Embodiment 6

In this embodiment, a periodicity of a resource that the terminal device needs to use may be any periodicity, for example, a periodicity divisible by 10240 ms (for example, 10 ms and 20 ms), or a periodicity indivisible by 10240 ms but divisible by symbol/slot/ms (for example, 3 ms, 6 ms, and 15 ms), or a periodicity neither divisible by 10240 ms nor divisible by symbol/slot/ms (for example, 1.6 ms, 1.7 ms, and 3.2 ms).

In this embodiment, starting from the first SPS resource position indicated in DCI, the terminal device considers resources at the same frequency domain positions at intervals of a periodicity of ms as SPS resources. Further, the terminal device may use HARQ processes 0, 1, . . . , and nrofHARQ-Processes−1 through polling for successively occurring SPS resources.

For example, for SPS, when an SPS/CG configuration is activated by using the DCI (for example, the periodicity is 3 ms), the terminal device considers resources at the same frequency domain positions, starting from the first SPS/CG resource position indicated in the DCI, at intervals of 3 ms as SPS/CG resources, but not to determine periodically occurring resource positions in the manner of Embodiment 1, Embodiment 2, or Embodiment 3. Further, the terminal device may use HARQ processes 0, 1, . . . , and nrofHARQ-Processes−1 through polling for successively occurring SPS/CG resources.

For another example, for SPS/CG, when an SPS/CG configuration is activated by using the DCI (for example, the periodicity is 1.6 ms), the terminal device considers resources at the same frequency domain positions, starting from the first SPS/CG resource position indicated in the DCI, at intervals of 1.6 ms as SPS/CG resources, but not to determine periodically occurring resource positions in the manner of Embodiment 4 or Embodiment 5. Further, the terminal device may use HARQ processes 0, 1, . . . , and nrofHARQ-Processes−1 through polling for successively occurring SPS/CG resources.

Based on this embodiment, the terminal device directly determines the resource position based on the configured periodicity according to a resource position required by service characteristics, instead of determining the resource position by using the foregoing formula. In this way, the network is not affected by the SFN wraps around, and is able to configure any periodicity.

Embodiment 7

Figure 5:
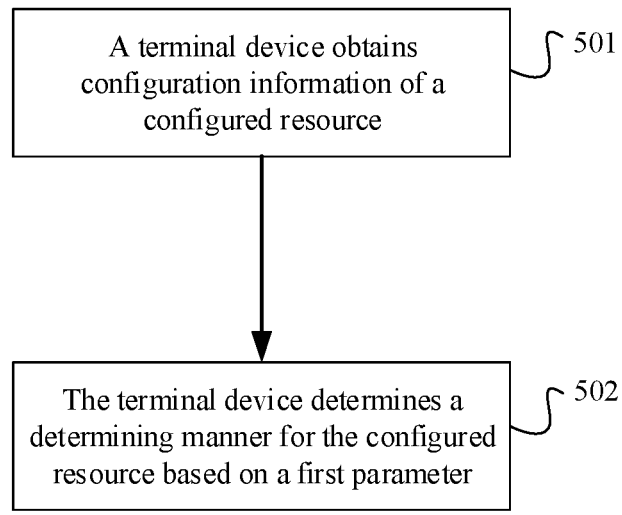
FIG. 5 is a schematic diagram of a method for determining a configured resource according to this application.

FIG. 5 illustrates a method for determining a configured resource according to this application. The method includes the following steps.

At step 501, a terminal device obtains configuration information of a configured resource, where the configuration information includes a first parameter, and the configured resource is a periodic resource.

At step 502, the terminal device determines a determining manner for the configured resource based on the first parameter.

Based on this solution, the terminal device may determine the determining manner for the configured resource based on the first parameter in the configuration information, to determine the configured resource in a relatively appropriate manner, thereby reducing a possibility of a deviation between a configured resource position obtained through calculation and that of a resource actually required by the terminal device, and helping implement effective configuration of the resources. In an implementation method, the first parameter is a periodicity parameter, and a determining manner to be used for the configured resource by the terminal device when a resource periodicity indicated by the periodicity parameter is indivisible by 10240 ms is different from that to be used when a resource periodicity is divisible by 10240 ms. The resource periodicity indicated by the periodicity parameter herein may be the resource periodicity in Embodiment 1 to Embodiment 3, that is, the resource periodicity is indivisible by 10240 ms but divisible by symbol/slot/ms. For example, the resource periodicity is divisible by ms, and the resource periodicity may be 3 ms, 6 ms, 15 ms, or the like. Alternatively, the resource periodicity indicated by the periodicity parameter herein may be the resource periodicity in Embodiment 4 to Embodiment 5, that is, the resource periodicity is neither divisible by 10240 ms nor divisible by symbol/slot/ms. For example, the resource periodicity is indivisible by ms, and the resource periodicity may be 1.6 ms, 1.7 ms, 3.2 ms, or the like.

In another implementation method, the first parameter is time information or indication information, the time information includes SFN information, H-SFN information, coordinated universal time (UTC), or global positioning system (GPS) time information, and the indication information is used to indicate a determining manner to be used for the configured resource by the terminal device. A determining manner to be used for the configured resource by the terminal device when the terminal device receives the first parameter is different from that to be used when the terminal device does not receive the first parameter.

In a specific implementation, that an SPS/CG resource position and/or SPS/CG process ID may be determined in different manners based on an SPS/CG periodicity value or an RRC indication. For different SPS/CG periodicities, the terminal device may determine SPS/CG resource positions and/or HARQ process IDs in different manners. When the SPS/CG periodicity is divisible by 10240 ms, the terminal device determines the SPS/CG resource position and the HARQ process ID according to the formula defined by NR R15. When the SPS/CG periodicity is indivisible by 10240 ms, the terminal device may determine the SPS/CG resource position and/or the HARQ process IDs in one of the manners in Embodiment 1 to Embodiment 6.

Optionally, the terminal device may determine whether to determine the SPS/CG resource position and the HARQ process ID in a manner defined in the prior art (hereinafter referred to as manner 1), or to determine the SPS/CG resource position and/or the HARQ process ID in another manner (such as any one of the manners in Embodiment 1 to Embodiment 6, hereinafter referred to as manner 2). For example, a determining condition may be:

When an RRC information element for SPS/CG configuration includes specific time information (the time information is the first parameter), the terminal device uses the manner 2: otherwise, the terminal device uses the manner 1. The time information may be, for example, SFN information, H-SFN information, or UTC/GPS time information. Further, which specific manner of the manner 2 to be used may be further determined based on specific content of the time information, that is, which manner of the foregoing Embodiment 1 to Embodiment 6 is to be used.

The network may define two types of SPS/CG periodicities. When the first type of periodicity is used during SPS/CG configuration by using the RRC (for example, all periodicities are divisible by 10240 ms), the terminal device uses the manner 1. When the second type of periodicity (for example, a periodicity indivisible by 10240 ms is included) is used during SPS/CG configuration by using the RRC, the terminal device uses the manner 2. Further, which specific manner of the manner 2 to be used may be further determined based on a length of the periodicity, that is, one manner of the foregoing Embodiment 1 to Embodiment 6 is to be used.

The network defines two types of SPS/CG configuration information elements, and the two types of configuration information elements have different names. For example, a name of the first type of configuration information element is SPS-Config, and a name of the second type of configuration information element is SPS-Config-r16. However, both contain various configuration parameters of SPS/CG. For example, an SPS/CG periodicity included in the first type of configuration information element is divisible by 10240 ms, and an SPS/CG periodicity included in the second type of configuration information element may be indivisible by 10240 ms. When the first type of information element is used during SPS/CG configuration by using the RRC, the terminal device uses the manner 1. When the second type of information element is used during SPS/CG configuration by using the RRC, the terminal device uses the manner 2.

During SPS/CG configuration on the network, one piece of indication information (indicator) for indicating whether the terminal device uses the manner 1 or the manner 2 may be explicitly carried. For example, the indicator may be a one-bit value, and has a value of 0 or 1. When indicator=0, the network instructs the terminal device to use the manner 1, and when indicator=1, the network instructs the terminal device to use the manner 2.

For different SPS/CG configuration periodicities, the terminal device determines a position of a periodic resource in different manners, so that a resource position required based on the service characteristics by the terminal device is consistent with a network-configured resource position determined by the terminal device, which is not affected by the SFN wrap around. The network may configure a periodicity to be any integer multiple of symbol/slot/ms. The terminal device determines, based on a predefined condition, to use a specific manner to determine the SPS/CG resource position and/or a manner of determining the HARQ process ID.

Embodiment 8

In the foregoing Embodiment 1 or Embodiment 2, for setting of an initial value of the counter, if 0 is initialized in some cases, a CG resource position perceived by the NW may be consequently inconsistent with a CG resource position perceived by the terminal device.

Figure 6:
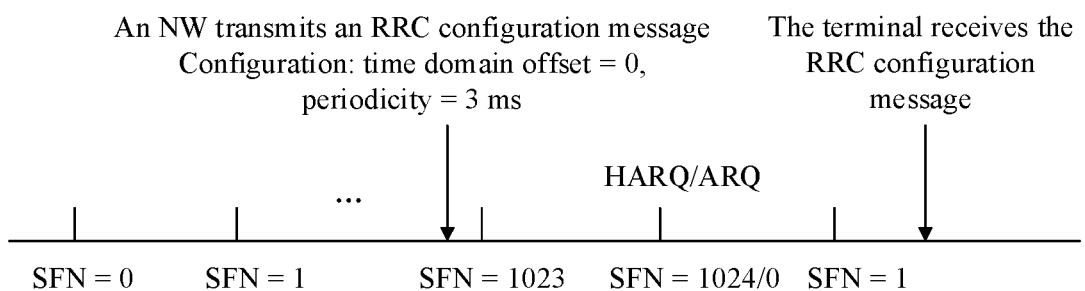
FIG. 6 is a schematic diagram of inconsistency between a CG resource position perceived by a network and a CG resource position perceived by a terminal device according to this application.

For example, as shown in FIG. 6, the NW transmits RRC configuration signaling in a radio frame of an SFN of 1022, and configures, based on the service characteristics, a CG corresponding to timeDomainOffset of 0 and periodicity of 3 ms. Because of HARQ/ARQ retransmission, the terminal device receives the RRC configuration signaling in a radio frame of an SFN of 2 after the SFN wraps around. In this case, timeDomainOffset between a periodic CG resource required by the terminal device and a closest position with an SFN of 0 is 2: however, the terminal device still considers that timeDomainOffset corresponding to the CG configured by the NW is 0. If the NW determines the CG resource position in the manner of Embodiment 1 or Embodiment 2, the CG resource position perceived by the NW may be consequently inconsistent with the CG resource position perceived by the terminal device.

In addition, the foregoing problem also exists when the terminal device reports a traffic pattern (including information such as an offset of the service relative to a position of the SFN of 0, a service periodicity, and a maximum transport block size) to the NW by using terminal device assistance information (also referred to as UE assistance information) (which is carried in RRC signaling) in LTE. For example, if the terminal device transmits the UE assistance information in the radio frame of the SFN of 1022 and the NW receives the UE assistance information in that of the SFN of 2, a traffic pattern, of the terminal device, perceived by the NW is inconsistent with an actual traffic pattern of the terminal device.

To resolve the foregoing problem, different solutions are provided below.

Method 1: A specific time value is carried in the RRC signaling when the NW configures the CG or the terminal device reports the UE assistance information. When the NW configures the CG type 1 by using the RRC signaling, one SFN_value1 is indicated in the configuration signaling, where the SFN_value1 may be an SFN value corresponding to a time point at which the NW generates the RRC signaling or transmits the RRC signaling. This manner may be combined with Embodiment 1 or Embodiment 2. When the terminal device receives the RRC configuration signaling or activates the CG type 1 configuration configured by using the RRC configuration signaling, a corresponding SFN value is SFN_value2. If SFN_value2≥SFN_value1, the counter value is set to 0: if currently SFN_value2<SFN_value1, the counter value is set to 1.

Method 2: When the NW supports an H-SFN and the NW configures the CG type 1 by using the RRC signaling, one H-SFN_value1 is indicated in the configuration signaling, where the H-SFN_value1 may be an H-SFN value corresponding to a time point at which the NW generates the RRC signaling or transmits the RRC signaling. This manner may be combined with Embodiment 1 or Embodiment 2. When the terminal device receives the RRC configuration signaling or activates the CG type 1 configuration configured by using the RRC configuration signaling, a corresponding H-SFN value is H-SFN_value2. If H-SFN_value2≥ H-SFN_value1, the counter value is set to 0; if currently H-SFN_value2<H-SFN_value1, the counter value is set to 1.

In a case in which the terminal device reports the UE assistance information, the terminal device may indicate one SFN_value3 (or an H-SFN_value3) in the RRC signaling, the SFN_value3 (or the H-SFN_value3) may be an SFN value (or an H-SFN value) corresponding to a time point at which the terminal device generates the RRC signaling or transmits the RRC signaling. Based on comparison between SFN_value4 and SFN_value3 when the network receives an RRC message reported by the terminal device or when an RRC layer parses the RRC message, or comparison between H-SFN_value4 and H-SFN_value3 when the network receives an RRC message reported by the terminal device or when an RRC layer parses the RRC message, the network determines an actual traffic pattern of the terminal device and determines how to configure/activate an appropriate SPS/CG. In an example, the terminal device indicates the SFN value in the UE assistance information. The terminal device includes an SFN_value3 of 1000 in the RRC signaling, which may indicate that an SFN corresponding to a time point at which the terminal device generates the RRC signaling is 1000. In addition, in the RRC signaling, the terminal device indicates a service periodicity of 3 ms and a service offset of 0) ms relative to the SFN of 0. When the network device successfully receives and parses the RRC message reported by the terminal device, the corresponding SFN_value4 is 1002. Because SFN_value4>SFN_value3, the network device may configure, for the terminal device based on traffic pattern information reported by the UE, a configured grant resource with timeDomainOffset of 0 and periodicity of 3 ms. For another example, the terminal device includes an SFN_value3 of 1022 in the RRC signaling, which may indicate that an SFN corresponding to a time point at which the terminal device generates the RRC signaling is 1022. In addition, in the RRC signaling, the terminal device indicates a service periodicity of 3 ms and a service offset of 0 ms relative to the SFN of 0. When the network device successfully receives and parses the RRC message reported by the terminal device, a corresponding SFN_value4 is 2. Because SFN_value4<SFN_value3, the SFN wraps around for the time point at which the terminal device generates the RRC message and the time point at which the network device successfully receives and parses the RRC message. The network device may determine that relative to a nearest position of the SFN of 0, the traffic pattern of the terminal device is: periodicity=3 ms and offset=2 ms. Therefore, the network device may configure, for the terminal device, a configured grant resource with timeDomainOffset of 2 and periodicity of 3 ms, to match an actual traffic pattern of the terminal device.

SFN or H-SFN information is carried in the configuration signaling for configuring the CG type 1 by the NW or in the signaling for reporting the UE assistance information by the terminal device, so that the terminal device and the NW obtain consistent perception on the actually configured CG resource position or the actual traffic pattern of the terminal device.

Embodiment 9

Figure 7:
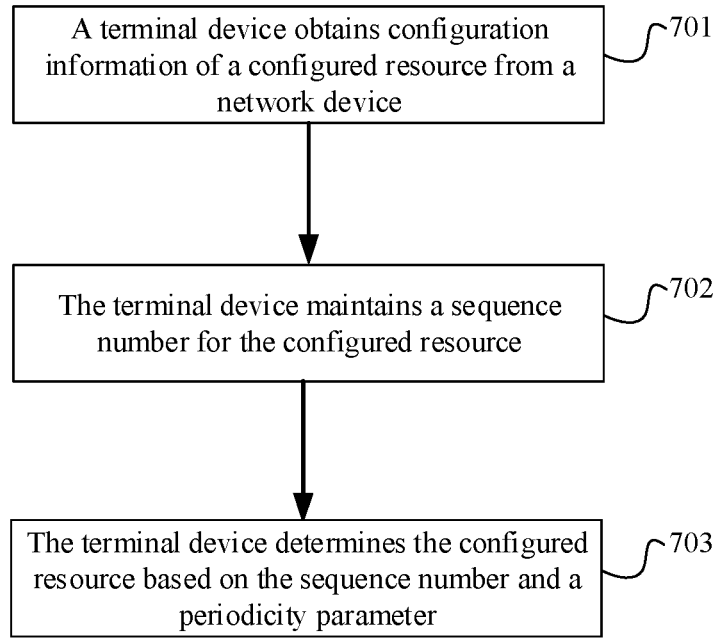
FIG. 7 is a schematic diagram of another method for determining a resource position according to this application.

As shown in FIG. 7, this application further discloses a method for determining a configured resource, and the method includes the following steps.

At step 701, a terminal device obtains configuration information of a configured resource from a network device, where the configured resource is a periodic resource, and the configuration information includes a periodicity parameter of the periodic resource.

At step 702, the terminal device maintains a sequence number for the configured resource, where the sequence number is updated when a system frame number SFN wraps around.

At step 703, the terminal device determines the configured resource based on the sequence number and the periodicity parameter.

Based on this solution, the terminal device can determine the configured resource based on the periodicity parameter of the periodic resource in the configuration information and the maintained sequence number, to reduce a possibility of a deviation between a configured resource position obtained through calculation and that of a resource actually required by the terminal device, thereby helping implement effective configuration of the configured resource.

It can be understood that the foregoing Embodiment 1 to Embodiment 3 are three specific application embodiments of the embodiment (namely, Embodiment 9) shown in FIG. 7. In addition, formula designs in the foregoing Embodiment 1 to Embodiment 3 are only examples, and are not intended to limit the application. Other designs can also be used. In this way, a time domain interval between configured resources determined by the terminal device based on the sequence number and the periodicity parameter before and after the SFN wraps around is equal to a periodicity of the periodic resource.

The following describes an association between Embodiment 9 and each of the foregoing Embodiment 1 to Embodiment 3:

1. Association Between Embodiment 9 and Embodiment 1

The periodicity parameter of the periodic resource included in the configuration information in Embodiment 9 may be, for example, the resource periodicity in Embodiment 1.

The sequence number maintained by the terminal device in Embodiment 9 may be the counter value in Embodiment 1.

In a first implementation, a value range of the sequence number is configured by the network device for the terminal device. In other words, the network device transmits the value range of the sequence number (which is, for example, carried in the configuration information) to the terminal. The value range of the sequence number may be, for example, 0) to K−1 or 1 to K, or starts from another arbitrary number to the another arbitrary number+K−1 (the arbitrary number is denoted by t, and the value range of the counter is t, t+1, t+2, . . . t+K−1). For example, K may be a minimum positive integer satisfying the following condition: K*10240 ms=Integer multiple of periodicity.

In a second implementation, the network device may include the value of K in the configuration information and transmit the value of K to the terminal device, and then the terminal device determines the value range based on the value of K.

In a third implementation, the value range of the sequence number may alternatively be determined by the terminal device. For example, after obtaining the periodicity parameter (also referred to as the resource periodicity) transmitted by the network device, the terminal device determines K as a minimum positive integer satisfying the following condition: K*10240 ms=Integer multiple of periodicity.

Optionally, the terminal device maintains the sequence number for the configured resource, and when the SFN wraps around, the sequence number is updated in the following manner: Updated sequence number=(Original sequence number+1) modulo K, where modulo is a modulo operation and K is a total quantity of the sequence numbers. Alternatively, the update manner is understood as counter= (counter+1) modulo K. To be specific, when the SFN wraps around, the counter value is incremented by 1, and a modulo operation is performed on the incremented result to avoid exceeding an allowable value range.

2. Association Between Embodiment 9 and Embodiment 2

The periodicity parameter of the periodic resource included in the configuration information in Embodiment 9 may be, for example, the resource periodicity in Embodiment 2.

The sequence number maintained by the terminal device in Embodiment 9 may be the counter value in Embodiment 2.

In a first implementation, a value range of the sequence number is configured by the network device for the terminal device. In other words, the network device transmits the value range of the sequence number (which is, for example, carried in the configuration information) to the terminal. The value range of the sequence number may be, for example, 0) to K−1 or 1 to K, or starts from another arbitrary number to the another arbitrary number+K−1 (the arbitrary number is denoted by t, and the value range of the counter is t, t+1, t+2, . . . , t+K−1), where K=24 and L is configured by the network device, or K is any positive integer and K is configured by the network device.

In a second implementation, the network device may include the value of K in the configuration information and transmit the value of K to the terminal device, and then the terminal device determines the value range based on the value of K, where K=24 or K is any positive integer.

In a third implementation, the value range of the sequence number may alternatively be determined by the terminal device. For example, when the terminal device obtains the configuration information of the value range of the sequence number transmitted by the network device, for example, the configuration information of the value range of the sequence number is the value of L, and then the terminal device determines K=24 based on L and further determines the value range based on the value of K.

Optionally, the terminal device maintains the sequence number for the configured resource, and when the SFN wraps around, the sequence number is updated in the following manner: Updated sequence number=(Original sequence number+1) modulo K, where modulo is a modulo operation and K is a total quantity of the sequence numbers. Alternatively, the update manner is understood as counter= (counter+1) modulo K. To be specific, when the SFN wraps around, the counter value is incremented by 1, and a modulo operation is performed on the incremented result to avoid exceeding an allowable value range.

3. Association Between Embodiment 9 and Embodiment 3

The sequence number maintained by the terminal device in Embodiment 9 may be the hyper-system frame number H-SFN in Embodiment 2.

In a first implementation, a value range of the sequence number is configured by the network device for the terminal device. In other words, the network device transmits the value range of the sequence number (which is, for example, carried in the configuration information) to the terminal. The value range of the sequence number may be, for example, 0) to K−1 or 1 to K, or starts from another arbitrary number to the another arbitrary number+K−1 (the arbitrary number is denoted by t, and the value range of the counter is t, t+1, t+2, . . . , t+K−1), where K=$2^M$ and the H-SFN is M bits in length.

In a second implementation, the network device may include the value of K in the configuration information and transmit the value of K to the terminal device, and then the terminal device determines the value range based on the value of K, where K=$2^M$.

In a third implementation, the value range of the sequence number may alternatively be determined by the terminal device. For example, when the terminal device obtains the configuration information of the value range of the sequence number transmitted by the network device, for example, the configuration information of the value range of the sequence number is the M value, the terminal device determines K=$2^M$ based on M, and further determines the value range based on the value of K. Optionally, the terminal device obtains H-SFN configuration information from the network device by using broadcast signaling, that is, obtains the M value of the H-SFN length (in units of bits), and one H-SFN identifies $2^{10+M}$ (namely, 1024*$2^M$) radio frames.

Optionally, that the terminal device maintains the sequence number for the configured resource, where when the SFN wraps around, the sequence number is updated including: performing, by the terminal device, an operation of incrementing the H-SFN by 1 for every 1024 radio frames.

For other specific implementation details of Embodiment 9, refer to the related descriptions in the foregoing Embodiment 1 to Embodiment 3. Details are not described herein again.

It should be noted that the foregoing embodiments may be implemented independently or implemented in combination. For example, Embodiment 7 is combined with Embodiments 1 to 6, Embodiment 8 is combined with Embodiment 1 or 2, and so on.

It can be understood that, to implement the foregoing functions, each network element described above includes a hardware structure and/or software module corresponding to each function. In combination with the units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. Different methods to implement the described functions for each particular application may be used and it should not be considered that the implementation goes beyond the scope of this application.

Figure 8:
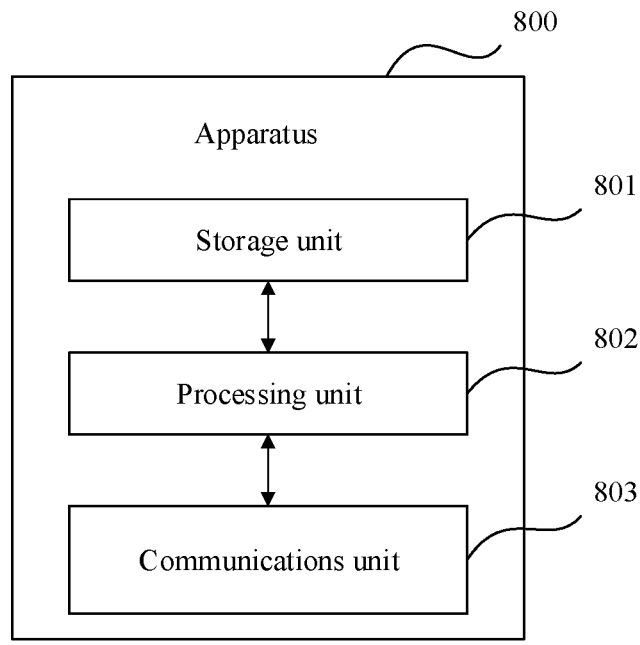
FIG. 8 is a schematic diagram of a communications apparatus according to this application.

FIG. 8 is a possible example block diagram of a communications apparatus in this application. The communications apparatus 800 may exist in a form of software or hardware. The communications apparatus 800 may include a processing unit 802 and a communications unit 803. In an implementation, the communications unit 803 may include a receiving unit and a transmission unit. The processing unit 802 is configured to control and manage actions of the communications apparatus 800. The communications unit 803 is configured to support communication between the communications apparatus 800 and other network entities. The communications apparatus 800 may further include a storage unit 801 for storing program code and data of the communications apparatus 800.

The processing unit 802 may be a processor or a controller, such as a general-purpose central processing unit (CPU), a general-purpose processor, a digital signal processor (DSP), an application specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor. The storage unit 801 may be a memory. The communications unit 803 is an interface circuit of the apparatus, and is configured to receive signals from other apparatuses. For example, when the apparatus is implemented in a manner of a chip, the communications unit 803 is an interface circuit, of the chip, configured to receive signals from other chips or apparatuses, or an interface circuit, of the chip, configured to transmit signals to other chips or apparatuses.

The communications apparatus 800 may be the terminal device in any one of the foregoing embodiments, or may be a chip used for the terminal device. For example, when the communications apparatus 800 is a terminal device, the processing unit 802 may be, for example, a processor, and the communications unit 803 may be, for example, a transceiver. Optionally, the transceiver may include a radio frequency circuit, and the storage unit may be, for example, a memory. For example, when the communications apparatus 800 is a chip used for a terminal device, the processing unit 802 may be, for example, a processor, and the communications unit 803 may be, for example, an input/output interface, a pin, or a circuit. The processing unit 802 is capable of executing computer-executable instructions stored in the storage unit. Optionally, the storage unit is a storage unit in the chip, such as a register and a cache, or the storage unit may be a storage unit located outside the chip in the terminal device, such as a read-only memory (ROM), another type of static storage device that can store static information and instructions, or a random access memory (RAM).

In a first embodiment, the communications unit 803 is configured to obtain configuration information of a configured resource from a network device, where the configured resource is a periodic resource, and the configuration information includes a periodicity parameter of the periodic resource. The processing unit 802 is configured to: maintain a sequence number for the configured resource, where the sequence number is updated when a system frame number SFN wraps around: and determine the configured resource based on the sequence number and the periodicity parameter.

In a possible implementation method, a value range of the sequence number is configured by the network device for the apparatus.

In a possible implementation method, the configuration information includes configuration information of a value range of the sequence number.

In a possible implementation method, the communications unit 803 is further configured to obtain the configuration information of the value range of the sequence number from the network device, where the configuration information is L, and L is a positive integer. The processing unit 802 is further configured to determine, based on the configuration information of the value range, that the value range of the sequence number is 0 to K−1 or 1 to K, where $K=2^L$.

In a possible implementation method, the communications unit 803 is further configured to obtain the configuration information of the value range of the sequence number from the network device, where the configuration information is K, and K is a positive integer. The processing unit 802 is further configured to determine, based on the configuration information of the value range, that the value range of the sequence number is 0 to K−1 or 1 to K.

In a possible implementation method, a value range of the sequence number is preset to 0 to K−1 or 1 to K, and satisfies: K*10240 ms=Positive integer multiple of a periodicity of the periodic resource.

In a possible implementation method, a value range of the sequence number is determined by a preset value L, and the value range of the sequence number is 0 to K−1 or 1 to K, where $K=2^L$.

In a possible implementation method, the processing unit 802 is configured to maintain the sequence number by using a counter, and the sequence number is a value of the counter.

In a possible implementation method, the processing unit 802 is configured to maintain the sequence number for the configured resource, where when the SFN wraps around, the sequence number is updated in the following manner: Updated sequence number=(Original sequence number+1) modulo K, where modulo is a modulo operation and K is a total quantity of the sequence numbers.

In a possible implementation method, the sequence number is a hyper-system frame number H-SFN.

In a possible implementation method, the communications unit 803 is further configured to obtain configuration information of the H-SFN from the network device by using broadcast signaling.

In a possible implementation method, the configuration information of the H-SFN is a length M of the H-SFN, and the H-SFN identifies $2^{10+M}$ radio frames.

In a possible implementation method, that the processing unit 802 is further configured to maintain the sequence number for the configured resource, where when the SFN wraps around, the sequence number is updated and includes: performing an operation of incrementing the H-SFN by 1 for every 1024 radio frames.

In a possible implementation method, a time domain interval determined for the configured resource before and after the SFN wraps around is equal to the periodicity of the periodic resource.

In a second embodiment, the communications unit 803 is configured to obtain configuration information of a configured resource, where the configuration information includes a first parameter and the configured resource is a periodic resource. The processing unit 802 is configured to determine a determining manner for the configured resource based on the first parameter.

In a possible implementation method, the first parameter is a periodicity parameter.

A determining manner to be used for the configured resource by the processing unit 802 when a resource periodicity indicated by the periodicity parameter is indivisible by 10240 ms is different from the determining matter to be used when a resource periodicity indicated by the periodicity parameter is divisible by 10240 ms.

In a possible implementation method, the first parameter is time information or indication information. The time information includes SFN information, H-SFN information, or coordinated universal time UTC/global positioning system GPS time information, and the indication information is used to indicate a determining manner to be used for the configured resource by the terminal device. A determining manner to be used for the configured resource by the processing unit 802 when the communications unit 803 receives the first parameter is different from the determining manner to be used when the processing unit 802 does not receive the first parameter.

In a possible implementation method, the processing unit 802 is configured to determine the configured resource based on the resource periodicity of the configured resource and a value of K. The resource periodicity of the configured resource is an integer multiple of symbol symbol/slot slot/ millisecond ms. The value of K is a minimum positive integer satisfying: K*10240 ms=Resource periodicity*M, where M is a positive integer, or K=$2^L$ and L is a configured positive integer, or K=$2^M$ and M is a length of a configured hyper-system frame number H-SFN, or K is a configured positive integer.

In a possible implementation method, the processing unit 802 is configured to maintain a counter for the configured resource, where a value range of the counter is 0 to K−1, or 1 to K.

In a possible implementation method, when the configured resource is activated, the counter is set to 0, and when a system frame number SFN wraps around, the counter is incremented by 1 and modulo K processing is performed.

In a possible implementation method, the configured resource is a time-frequency resource of a configured grant type 1, and the configuration information further includes a frame number for generating the configuration information or transmitting the configuration information by a network device. The frame number is a system frame number SFN or a hyper-system frame number H-SFN. If a frame number for receiving the configuration information by the communications unit 803 is greater than or equal to the frame number in the configuration information, the processing unit 802 is configured to set the counter to 0; otherwise, the counter is set to 1. This helps set a correct initial value for the counter.

In a possible implementation method, the configured resource is a time-frequency resource of a configured grant type 1. The communications unit 803 is configured to transmit assistance information to the network device by using RRC signaling, and the assistance information is used to indicate a traffic pattern of the terminal device.

In a possible implementation method, the value of K is carried in the configuration information.

In a possible implementation method, the value of K is configured at a MAC granularity or a cell granularity (per MAC/per Cell).

In a possible implementation method, the configuration information further includes a bitmap, and the bitmap includes Q bits. Each of the Q bits corresponds to one time zone, and each bit is used to indicate whether a resource is configured in the corresponding time zone. The time zone is X slot/symbol/ms, where X is a positive integer. The processing unit 802 is configured to determine the configured resource based on the bitmap.

In a possible implementation method, the resource periodicity of the configured resource is a non-integer multiple of slot/ms. The processing unit 802 is configured to: determine a validity position of the configured resource based on the resource periodicity, and determine the configured resource based on the validity position.

It can be understood that, for a specific implementation process and corresponding beneficial effects when the communications apparatus is used for the foregoing method for determining a configured resource, reference may be made to the related descriptions in the foregoing method embodiments, and details are not described herein again.

Figure 9:
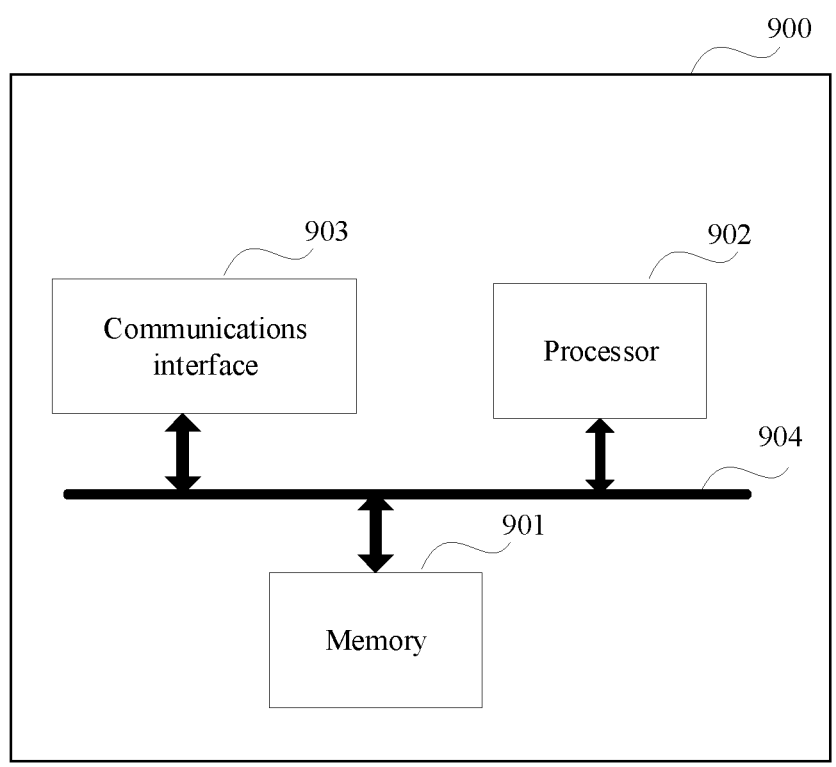
FIG. 9 is a schematic diagram of another communications apparatus according to this application.

FIG. 9 is a schematic diagram of a communications apparatus according to this application. The communications apparatus may be the foregoing terminal device. The communications apparatus 900 includes a processor 902, a communications interface 903, and a memory 901. Optionally, the communications apparatus 900 may further include a communications line 904. The communications interface 903, the processor 902, and the memory 901 may be connected to each other by using the communications line 904. The communications line 904 may be a peripheral component interconnect (PCI) bus, an extended industry standard architecture (EISA) bus, or the like. The communications line 904 may be classified into an address bus, a data bus, a control bus, and the like. For ease of representation, one thick line is used to represent the bus in FIG. 9, but this does not mean that there is only one bus or only one type of bus.

The processor 902 may be a CPU, a microprocessor, an ASIC, or one or more integrated circuits for controlling program execution in the solutions of this application.

The communications interface 903 is configured to communicate, by using any apparatus such as a transceiver, with other devices or a communications network, for example, an Ethernet, a radio access network (RAN), a wireless local area network (WLAN), or a wired access network.

The memory 901 may be a ROM, another type of static storage device that can store static information and instructions, a RAM, or another type of dynamic storage device that can store information and instructions: or may be an electrically erasable programmable read-only memory (EE-PROM), a compact disc read-only memory (CD-ROM) or other optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that is accessible to a computer. However, this does not constitute any limitation. The memory may exist independently and is connected to the processor by using the communications line 904. Alternatively, the memory may be integrated with the processor.

The memory 901 is configured to store a computer-executable instruction for executing the solutions of this application, and the processor 902 controls execution of the computer-executable instruction. The processor 902 is configured to execute the computer-executable instruction stored in the memory 901, to implement the method for determining a configured resource provided in the foregoing embodiments of this application.

Optionally, the computer-executable instruction in this embodiment of this application may also be referred to as application program code. This embodiment of this application imposes no specific limitation thereon.

A person of ordinary skill in the art can understand that "first", "second", and various numbers in this application are used merely for distinguishing for ease of description, and are not intended to limit the scope of the embodiments of this application, and also represent a sequential order. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. At least two means two or more. "At least one", "any one", or a similar expression means any combination of the items mentioned, including any combination of singular items (pieces) or plural items (pieces). For example, at least one of a, b, or c may represent: a, b, c, a-b, a-c, b-c, or a-b-c, where a, b, and c may be singular or plural. "A plurality of" means two or more, and other quantifiers are similar. In addition, unless otherwise specified in the context, elements in singular forms "a", "an", and "the" mean "one or more than one", but not mean "one or only one". For example, "a device" means one or more devices.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general purpose processor, a digital signal processor, an application specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor may read information from the storage medium and write information to the storage medium. Optionally, the storage medium may alternatively be integrated into the processor. The processor and the storage medium may be arranged in an ASIC, and the ASIC may be arranged in a terminal device. Optionally, the processor and the storage medium may alternatively be arranged in different components of a terminal device.

These computer program instructions may alternatively be loaded onto a computer or another programmable data processing device, so that a series of operations and steps are performed on the computer or the another programmable device, thereby generating computer-implemented processing. Therefore, the instructions executed on the computer or other programmable devices provide steps for implementing a specific function in one or more processes in the flowcharts and/or in one or more blocks in the block diagrams.

Although this application is described with reference to specific features and the embodiments thereof, clearly, various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. Clearly, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:
   obtaining, by a terminal device, configuration information of a configured resource, wherein the configured resource is a periodic resource, and the configuration information comprises a first parameter, and wherein the first parameter comprises a system frame number (SFN):
   determining, by the terminal device, a determining manner for the configured resource based on the first parameter; and determining, by the terminal device, the configured resource in accordance with the determining manner by:
  determining, by the terminal device, a position of the configured resource based on the SFN in accordance with the determining manner, and
  determining, by the terminal device, the configured resource at a frequency domain position, starting from the determined position, at an interval of a periodicity of the configured resource.

2. The method according to claim 1, wherein the configuration information further comprises a periodicity parameter of the periodic resource.

3. The method according to claim 2, wherein a first determining manner to be used for the configured resource by the terminal device in accordance with a value of the periodicity parameter of the configured resource being divisible by 10240 ms is different from a second determining manner to be used for the configured resource by the terminal device in accordance with the value of the periodicity parameter of the configured resource being indivisible by 10240 ms.

4. The method according to claim 1, wherein the configuration information further comprises indication information that indicates the determining manner.

5. The method according to claim 4, wherein the determining manner is a first determining manner that is different from a second determining manner to be used in accordance with the configuration information excluding the first parameter.

6. An apparatus, comprising:
one or more processors:
a non-transitory memory coupled to the one or more processors, wherein the non-transitory memory stores a program to be executed by the one or more processors, the program comprising instructions for:
obtaining configuration information of a configured resource, wherein the configured resource is a periodic resource, and the configuration information comprises a first parameter, and wherein the first parameter comprises a system frame number (SFN):
determining a determining manner for the configured resource based on the first parameter; and
determining the configured resource in accordance with the determining manner by:
  determining, by the terminal device, a position of the configured resource based on the SFN in accordance with the determining manner, and
  determining, by the terminal device, the configured resource at a frequency domain position, starting from the determined position, at an interval of a periodicity of the configured resource.

7. The apparatus according to claim 6, wherein the configuration information further comprises a periodicity parameter of the periodic resource.

8. The apparatus according to claim 7, wherein a first determining manner to be used for the configured resource by the terminal device in accordance with a value of the periodicity parameter of the configured resource being divisible by 10240 ms is different from a second determining manner to be used for the configured resource by the terminal device in accordance with the value of the periodicity parameter of the configured resource being indivisible by 10240 ms.

9. The apparatus according to claim 6, wherein the configuration information further comprises indication information that indicates the determining manner.

10. The apparatus according to claim 9, wherein the determining manner is a first determining manner that is different from a second determining manner to be used in accordance with the configuration information excluding the first parameter.

11. A non-transitory computer readable medium, wherein the non-transitory computer readable medium stores instructions that are executable by a computer, and the instructions cause the computer to:
obtain configuration information of a configured resource, wherein the configured resource is a periodic resource, and the configuration information comprises a first parameter, and wherein the first parameter comprises a system frame number (SFN):
determine a determining manner for the configured resource based on the first parameter; and
determine the configured resource in accordance with the determining manner by:
  determining, by the terminal device, a position of the configured resource based on the SFN in accordance with the determining manner, and
  determining, by the terminal device, the configured resource at a frequency domain position, starting from the determined position, at an interval of a periodicity of the configured resource.

12. The non-transitory computer readable medium according to claim 11, wherein the configuration information further comprises a periodicity parameter of the periodic resource.

* * * * *

UNITED STATES PATENT AND TRADEMARK OFFICE
CERTIFICATE OF CORRECTION

PATENT NO. : 12,075,429 B2  
APPLICATION NO. : 17/384381  
DATED : August 27, 2024  
INVENTOR(S) : Fan et al.

Page 1 of 1

It is certified that error appears in the above-identified patent and that said Letters Patent is hereby corrected as shown below:

In the Claims

Claim 1: Column 36, Line 64: "(SFN):" should read as -- (SFN); --.

Claim 6: Column 37, Line 32: "one or more processors:" should read as -- one or more processors; --.

Claim 6: Column 37, Line 42: "prises a system frame number (SFN):" should read as -- prises a system frame number (SFN); --.

Claim 11: Column 38, Line 32: "system frame number (SFN):" should read as -- system frame number (SFN); --.

Signed and Sealed this  
Sixth Day of May, 2025

Coke Morgan Stewart  
*Acting Director of the United States Patent and Trademark Office*